(12) United States Patent
Itabashi

(10) Patent No.: US 9,964,917 B2
(45) Date of Patent: May 8, 2018

(54) DEVELOPING CARTRIDGE PROVIDED WITH PROTRUSION MOVABLE WITH ROTATION OF GEAR

(71) Applicant: Brother Kogyo Kabushiki Kaisha, Nagoya-shi, Aichi-ken (JP)

(72) Inventor: Nao Itabashi, Nagoya (JP)

(73) Assignee: Brother Kogyo Kabushiki Kaisha, Nigoya-shi, Aichi-ken (JP)

( * ) Notice: Subject to any disclaimer, the term of this patent is extended or adjusted under 35 U.S.C. 154(b) by 0 days. days.

(21) Appl. No.: 15/275,698

(22) Filed: Sep. 26, 2016

(65) Prior Publication Data
US 2017/0277116 A1    Sep. 28, 2017

(30) Foreign Application Priority Data
Mar. 24, 2016    (JP) .................................. 2016-060606

(51) Int. Cl.
| | |
|---|---|
| *G03G 21/16* | (2006.01) |
| *F16H 25/16* | (2006.01) |
| *F16H 1/20* | (2006.01) |
| *G03G 15/08* | (2006.01) |

(52) U.S. Cl.
CPC .......... *G03G 21/1647* (2013.01); *F16H 1/20* (2013.01); *F16H 25/16* (2013.01); *G03G 15/0865* (2013.01)

(58) Field of Classification Search
CPC ............ G03G 21/1647; G03G 15/0865; F16H 25/16; F16H 1/20
See application file for complete search history.

(56) References Cited

U.S. PATENT DOCUMENTS

| 7,512,347 B2 | 3/2009 | Suzuki et al. |
| 9,323,214 B2 | 4/2016 | Itabashi et al. |
| 2006/0193646 A1 | 8/2006 | Suzuki et al. |

(Continued)

FOREIGN PATENT DOCUMENTS

| CN | 202975597 U | 6/2013 |
| JP | 2006-267994 A | 10/2006 |

(Continued)

OTHER PUBLICATIONS

Nov. 15, 2016—(WO) ISR and Written Opinion (English Translation)—PCT/JP2016/078175.

*Primary Examiner* — David M Gray
*Assistant Examiner* — Laura Roth
(74) *Attorney, Agent, or Firm* — Banner & Witcoff, Ltd.

(57) ABSTRACT

A developing cartridge includes: a first gear; a second gear; a gear cover; and a protrusion. The first gear is rotatable about a first axis extending in a predetermined direction. The first gear is movable from a first position to a second position. The second gear is rotatable about a second axis extending in the predetermined direction upon receipt of a drive force from the first gear. The gear cover has an opening and covers at least a portion of the second gear. The protrusion extends in the predetermined direction. The protrusion is movable with the rotation of the second gear while the first gear moves from the first position to the second position. The protrusion is further movable past the opening at least once after the protrusion moves past the opening once, while the protrusion moves with the rotation of the second gear.

12 Claims, 23 Drawing Sheets

(56) References Cited

U.S. PATENT DOCUMENTS

| | | | |
|---|---|---|---|
| 2007/0122165 A1* | 5/2007 | Igarashi | G03G 15/0822 399/12 |
| 2007/0140725 A1* | 6/2007 | Kamimura | G03G 21/1857 399/90 |
| 2011/0243578 A1* | 10/2011 | Ukai | G03G 21/1896 399/12 |
| 2012/0051795 A1* | 3/2012 | Mushika | G03G 15/0863 399/262 |
| 2013/0051814 A1* | 2/2013 | Itabashi | G03G 21/1857 399/12 |
| 2013/0051816 A1* | 2/2013 | Itabashi | G03G 21/1652 399/12 |
| 2013/0051849 A1 | 2/2013 | Itabashi et al. | |
| 2015/0277281 A1 | 10/2015 | Mushika et al. | |
| 2015/0277353 A1 | 10/2015 | Fukamachi | |
| 2016/0202631 A1 | 7/2016 | Itabashi et al. | |

FOREIGN PATENT DOCUMENTS

| | | |
|---|---|---|
| JP | 2013-054058 A | 3/2013 |
| JP | 2015-197533 A | 11/2015 |
| JP | 2015-197534 A | 11/2015 |

\* cited by examiner

DEVELOPING CARTRIDGE PROVIDED WITH PROTRUSION MOVABLE WITH ROTATION OF GEAR

CROSS REFERENCE TO RELATED APPLICATION

This application claims priority from Japanese Patent Application No. 2016-060606 filed Mar. 24, 2016. The entire content of the priority application is incorporated herein by reference.

TECHNICAL FIELD

The present disclosure relates to a developing cartridge.

BACKGROUND

There is conventionally known a developing cartridge including a developing roller. The developing cartridge is detachably attached to an image forming apparatus.

For example, the developing cartridge includes a gear rotatable from a first position to a second position, and a protrusion provided at the gear. The protrusion moves together with the rotation of the gear and contacts a lever provided at the image forming apparatus. The lever moves when the lever contacts the protrusion. The image forming apparatus detects the movement of the lever to determine specification of the developing cartridge currently attached thereto.

SUMMARY

The developing cartridge is required to be reduced in size, whereas the number of specifications of the developing cartridge tends to increase.

For the purpose of the increase in the number of specifications, it has been considered that the signal pattern generated by the movement of the protrusion is made different depending on developing cartridges having different specifications.

In view of the foregoing, it is an object of the disclosure to provide a developing cartridge capable of easily varying a signal pattern generated by movement of a protrusion.

In order to attain the above and other objects, according to one aspect, the disclosure provides a developing cartridge including: a first gear; a second gear; a gear cover; and a protrusion. The first gear is rotatable about a first axis extending in a predetermined direction. The first gear is movable from a first position to a second position. The second gear is rotatable about a second axis extending in the predetermined direction upon receipt of a drive force from the first gear. The gear cover has an opening and covers at least a portion of the second gear. The protrusion extends in the predetermined direction. The protrusion is movable with the rotation of the second gear while the first gear moves from the first position to the second position. The protrusion is further movable past the opening at least once after the protrusion moves past the opening once, while the protrusion moves with the rotation of the second gear.

According to another aspect, the disclosure provides a developing cartridge including: a first gear; a second gear; a protrusion; and a pivot member. The first gear is rotatable about a first axis extending in a predetermined direction. The first gear is movable from a first position to a second position. The second gear is rotatable about a second axis extending in the predetermined direction upon receipt of a drive force from the first gear. The protrusion extends in the predetermined direction. The protrusion is movable with the rotation of the second gear while the first gear moves from the first position to the second position. The pivot member is pivotally movable about a third axis extending in the predetermined direction upon contact with the protrusion. The protrusion is further in contact with the pivot member at least once after the protrusion contacts the pivot member once, while the first gear moves from the first position to the second position.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. Overall Structure of Developing Cartridge 1

Figure 1:
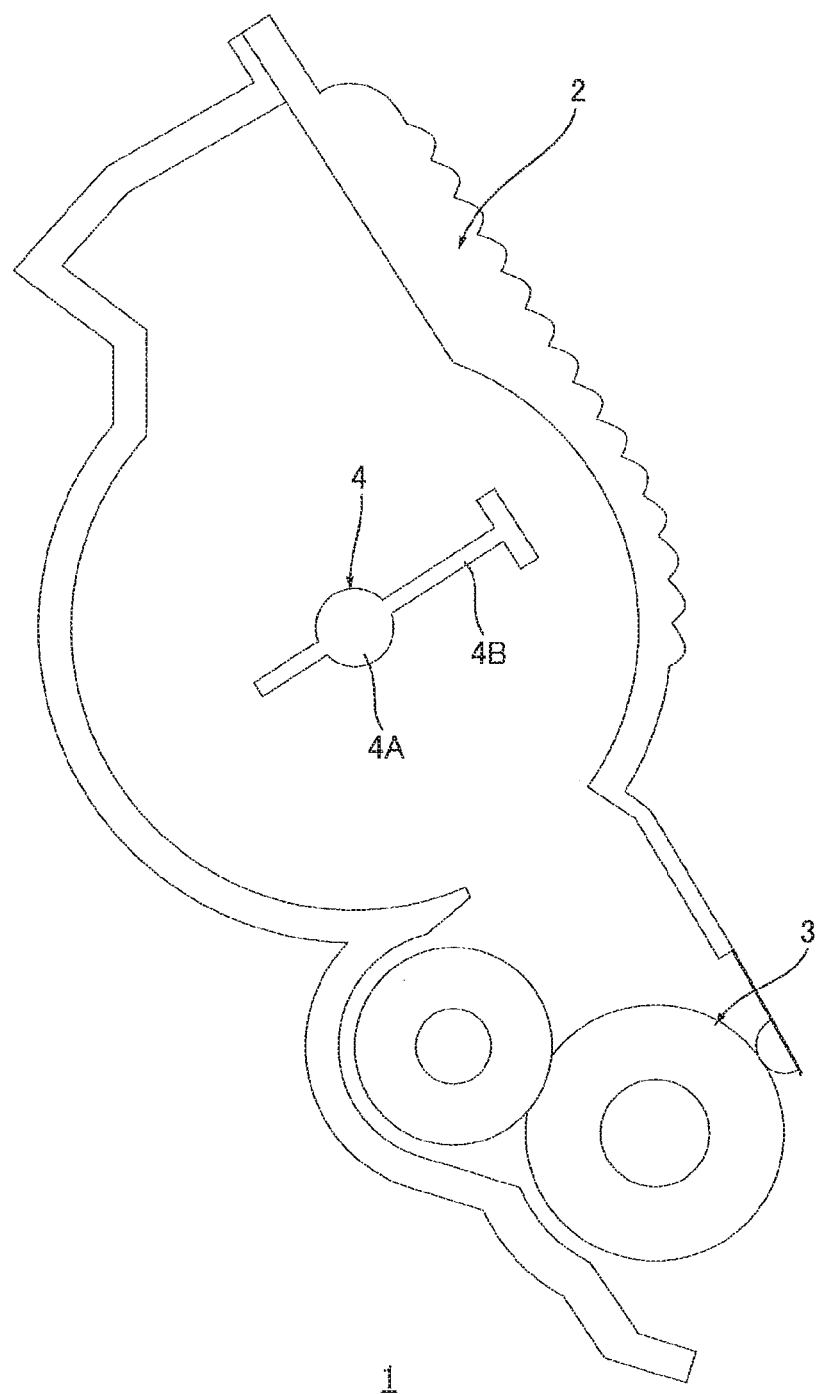
FIG. 1 is a schematic view illustrating a general configuration of a developing cartridge.

An overall structure of a developing cartridge 1 will be described with reference to FIG. 1.

The developing cartridge 1 is a cartridge that is configured to contain a developer. The developing cartridge 1 includes a casing 2, a developing roller 3, and an agitator 4. The developing roller 3 is rotatable about a rotation axis extending in a predetermined direction.

1.1 Casing 2

The casing 2 extends in the predetermined direction. The casing 2 is configured to contain the developer. The developer is toner, for example. Hereinafter, when referring to an inside and an outside of the casing 2, a side at which the developer is contained will be referred to as the "inside" of the casing 2, and a side opposite to the inside of the casing 2 will be referred to as the "outside" of the casing 2.

1.2 Developing Roller 3

The developing roller 3 is positioned at one end portion of the casing 2. The developing roller 3 extends in the predetermined direction. A portion of a peripheral surface of the developing roller 3 is exposed to the outside of the casing 2.

1.3 Agitator 4

The agitator 4 is configured to agitate the developer in the casing 2 and to feed the developer in the casing 2 to the developing roller 3. The agitator 4 is positioned inside the casing 2. The agitator 4 is rotatable about a rotation axis extending in the predetermined direction. The agitator 4 has an agitator shaft 4A and a fin 4B. The agitator shaft 4A extends in the predetermined direction. The fin 4B extends from the agitator shaft 4A in a direction crossing the predetermined direction.

2. Overall Structure of Gear Train

Figure 2:
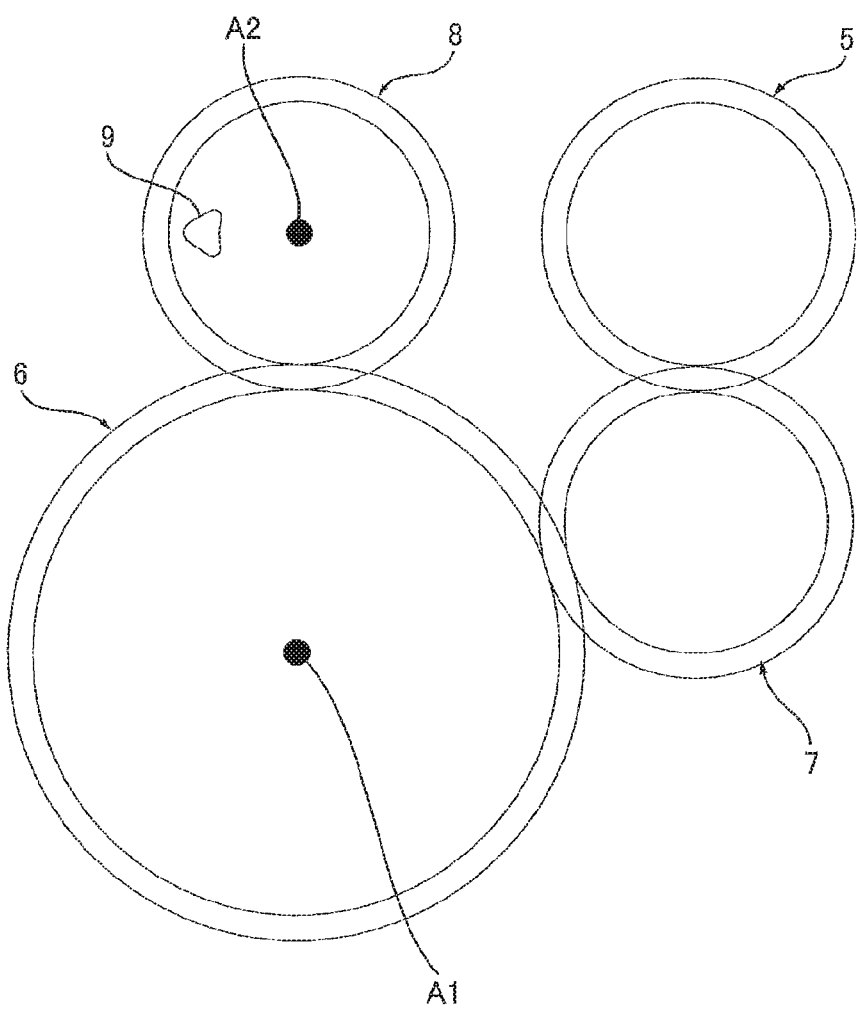
FIG. 2 is a schematic view illustrating a general configuration of a gear train provided in the developing cartridge.

Next, a gear train provided at the developing cartridge 1 will be described with reference to FIG. 2.

The developing cartridge 1 includes a gear train driven by receiving a drive force from an image forming apparatus. Specifically, the gear train of the developing cartridge 1 includes an agitator gear 5, a first gear 6, an idle gear 7, a second gear 8, and a protrusion 9.

The agitator gear 5 is rotatable by receiving a drive force inputted from the image forming apparatus to the developing cartridge 1. The agitator gear 5 is rotatable together with the agitator shaft 4A. The agitator gear 5 includes a plurality of gear teeth on a periphery of the agitator gear 5. The plurality of gear teeth of the agitator gear 5 is arranged in a rotational direction of the agitator gear 5.

The first gear 6 includes a plurality of gear teeth on a periphery of the first gear 6. The plurality of gear teeth of the first gear 6 is arranged in a rotational direction of the first gear 6. The first gear 6 may directly mesh with the agitator gear 5. Alternatively, one or more idle gears 7 may be interposed between the first gear 6 and the agitator gear 5. That is, any configuration may be possible as long as the first gear 6 can receive the drive force inputted from the image forming apparatus to the developing cartridge 1. For example, the first gear 6 may mesh with a coupling gear 11B described later. Alternatively, the first gear 6 may receive the drive force from a coupling 11 described later through an unillustrated gear train without intervention of the agitator gear 5. The first gear 6 can rotate about a first axis A1 extending in the predetermined direction upon receipt of the drive force.

The idle gear 7 is a gear for transmitting the drive force from the agitator gear 5 to first gear 6. The idle gear 7 includes a plurality of gear teeth on a periphery of the idle gear 7. The plurality of gear teeth of the idle gear 7 is arranged in a rotational direction of the idle gear 7. The idle gear 7 meshes with the agitator gear 5 and the first gear 6. The idle gear 7 is rotatable upon receipt of the drive force from the agitator gear 5 and can transmit the received drive force to the first gear 6.

The second gear 8 includes a plurality of gear teeth on a periphery of the second gear 8. The plurality of gear teeth of the second gear 8 is arranged in a rotational direction of the second gear 8. The second gear 8 meshes with the first gear 6. With this configuration, the second gear 8 is rotatable by receiving the drive force from the first gear 6. The second gear 8 is rotatable about a second axis A2 extending in the predetermined direction. The second gear 8 may directly mesh with the first gear 6. Alternatively, one or more unillustrated idle gears may be interposed between the second gear 8 and the first gear 6. In the latter case, the second gear 8 can receive the drive force from the first gear 6 through the unillustrated idle gear(s).

The protrusion 9 is rotatable together with the second gear 8. In other words, the protrusion 9 can circularly move together with the rotation of the second gear 8. The image forming apparatus detects the movement of the protrusion 9 to thereby read information of the developing cartridge 1.

After the image forming apparatus reads the information of the developing cartridge 1, the protrusion 9 stops moving when the second gear 8 stops rotating.

Next, the gear train will be described in detail with reference to specific embodiments of the developing cartridge.

First Embodiment

1. Developing Cartridge 10 According to First Embodiment

A developing cartridge 10 according to a first embodiment will be described with reference to FIGS. 3 through 10, wherein like parts and components are designated by the same reference numerals as those of the above-described developing cartridge 1 to avoid duplicating description.

Figure 3:
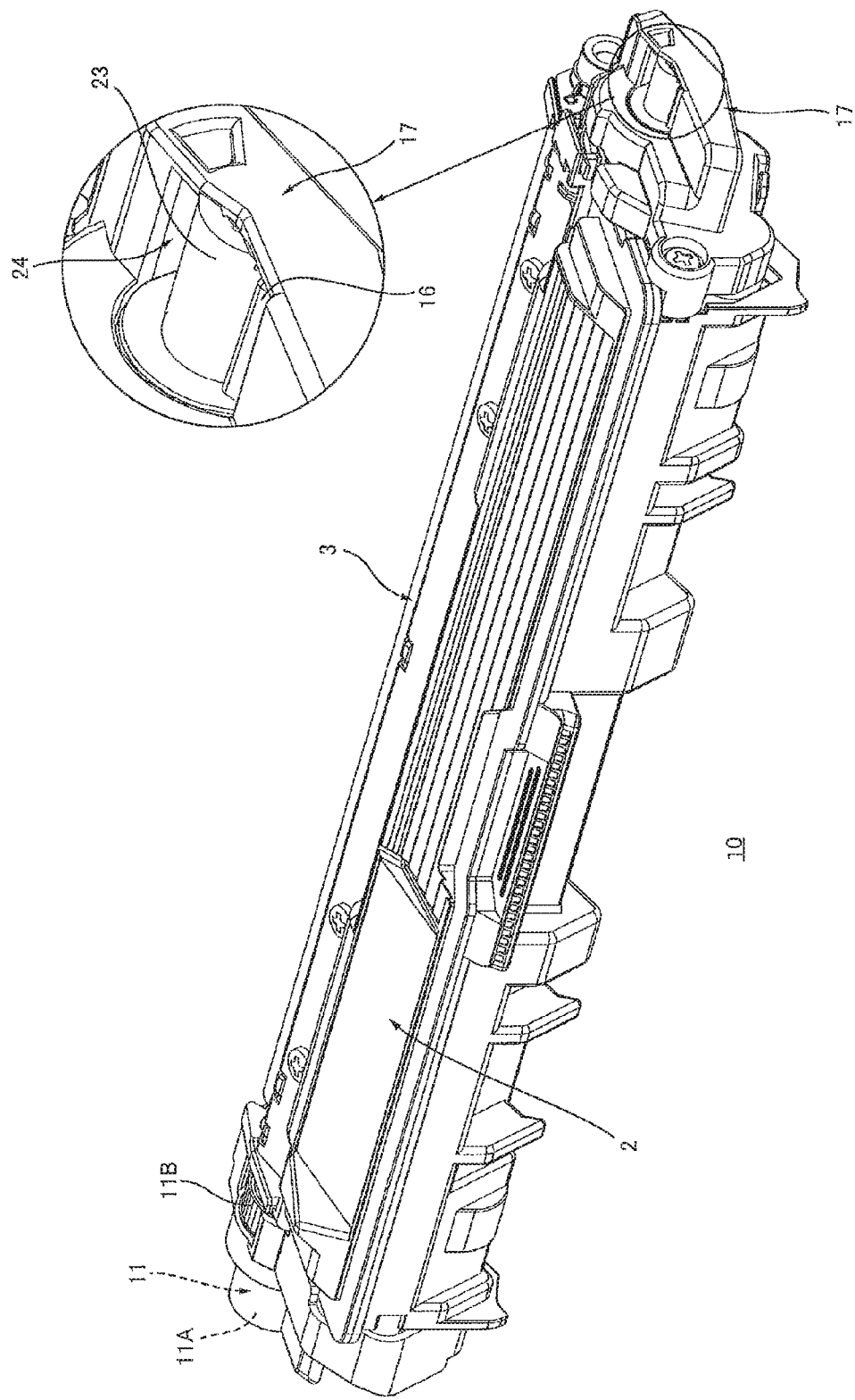
FIG. 3 is a perspective view of a developing cartridge according to a first embodiment.
Figure 4:
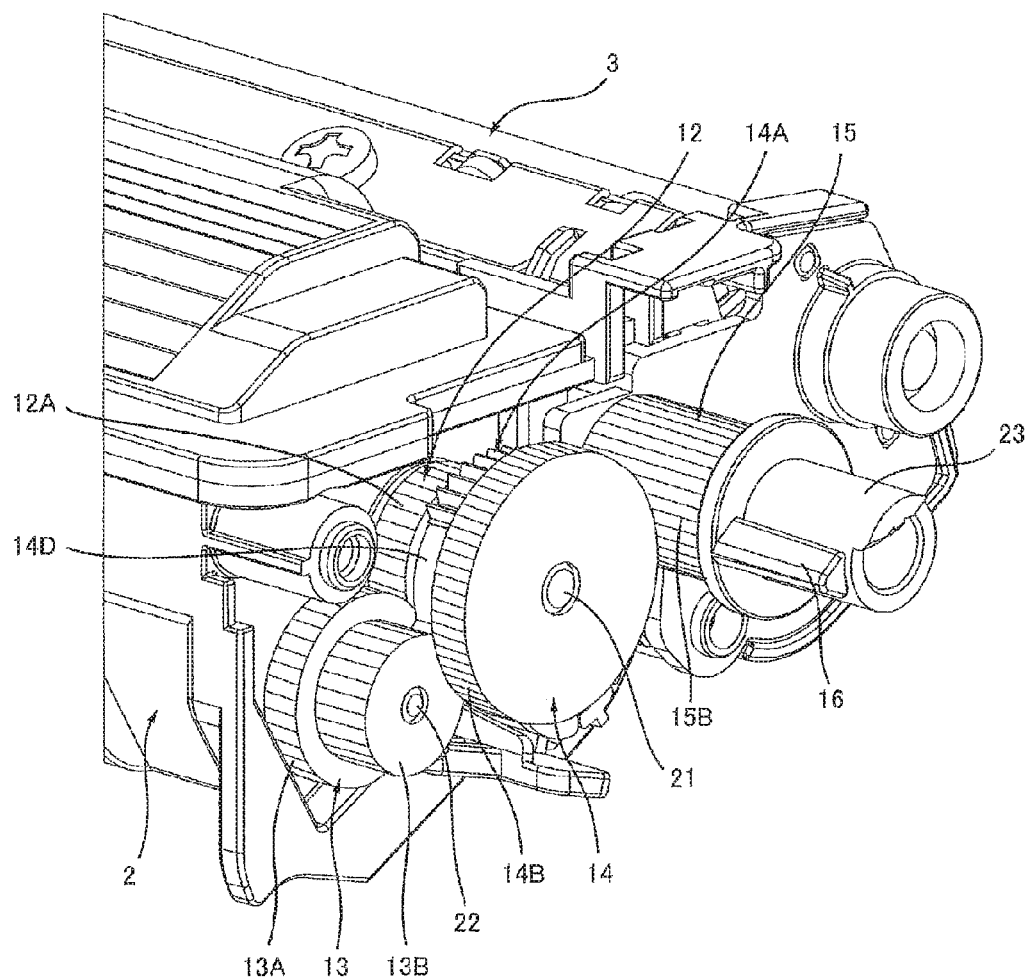
FIG. 4 is a perspective view of a gear train provided in the developing cartridge according to the first embodiment.

As illustrated in FIGS. 3 and 4, the developing cartridge 10 includes the casing 2, the developing roller 3, the agitator 4, the coupling 11, an agitator gear 12, an idle gear 13, a first gear 14, a second gear 15, a protrusion 16, and a gear cover 17.

1.1 Coupling 11

The coupling 11 is positioned at an outer surface on one side of the casing 2 in the predetermined direction. The coupling 11 is rotatable about an axis extending in the predetermined direction. The coupling 11 includes a joint 11A and the coupling gear 11B.

The joint 11A has a configuration for receiving the drive force from the image forming apparatus in a state where the developing cartridge 10 is attached to the image forming apparatus.

The joint 11A is positioned at one end portion of the coupling 11 in the predetermined direction. The joint 11A is positioned opposite to the casing 2 with respect to the coupling gear 11B in the predetermined direction. The joint 11A can be engaged with a drive force input part of the image forming apparatus. Upon engagement of the joint 11A with the drive force input part of the image forming apparatus, the coupling 11 can receive the drive force from the drive force input part of the image forming apparatus.

The coupling gear 11B is positioned between the joint 11A and the casing 2 in the predetermined direction. The coupling gear 11B is rotatable together with the joint 11A. The coupling gear 11B includes a plurality of gear teeth. The plurality of gear teeth of the coupling gear 11B is provided on a peripheral surface of the coupling gear 11B.

The developing cartridge 10 further includes an unillustrated gear train meshing with the coupling gear 11B. The unillustrated gear train is positioned at the outer surface of the one side of the casing 2 in the predetermined direction and transmits the drive force to the developing roller 3 and the agitator 4.

1.2 Agitator Gear 12

Figure 5:
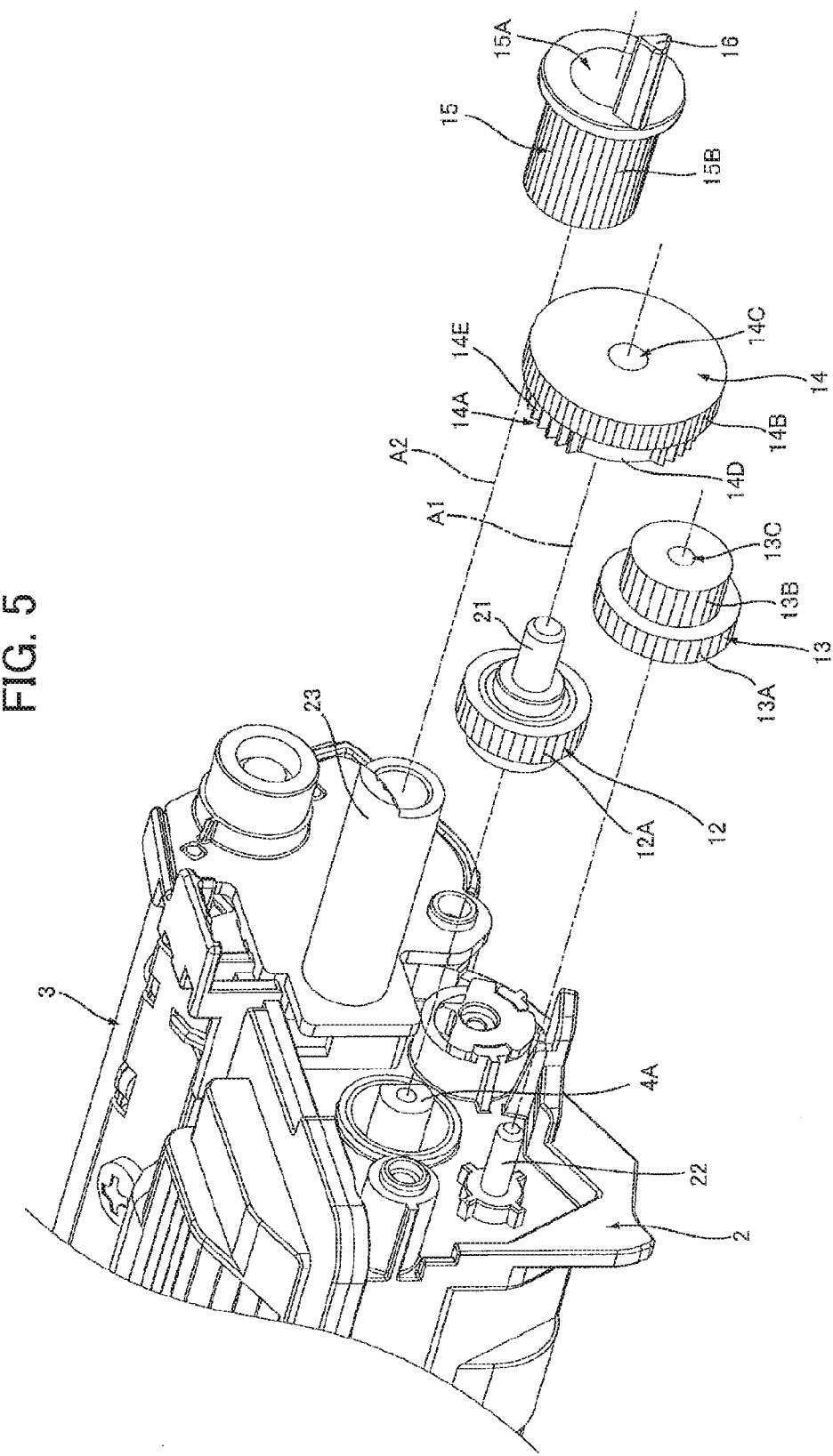
FIG. 5 is an exploded perspective view of the gear train illustrated in FIG. 4.
Figure 6:
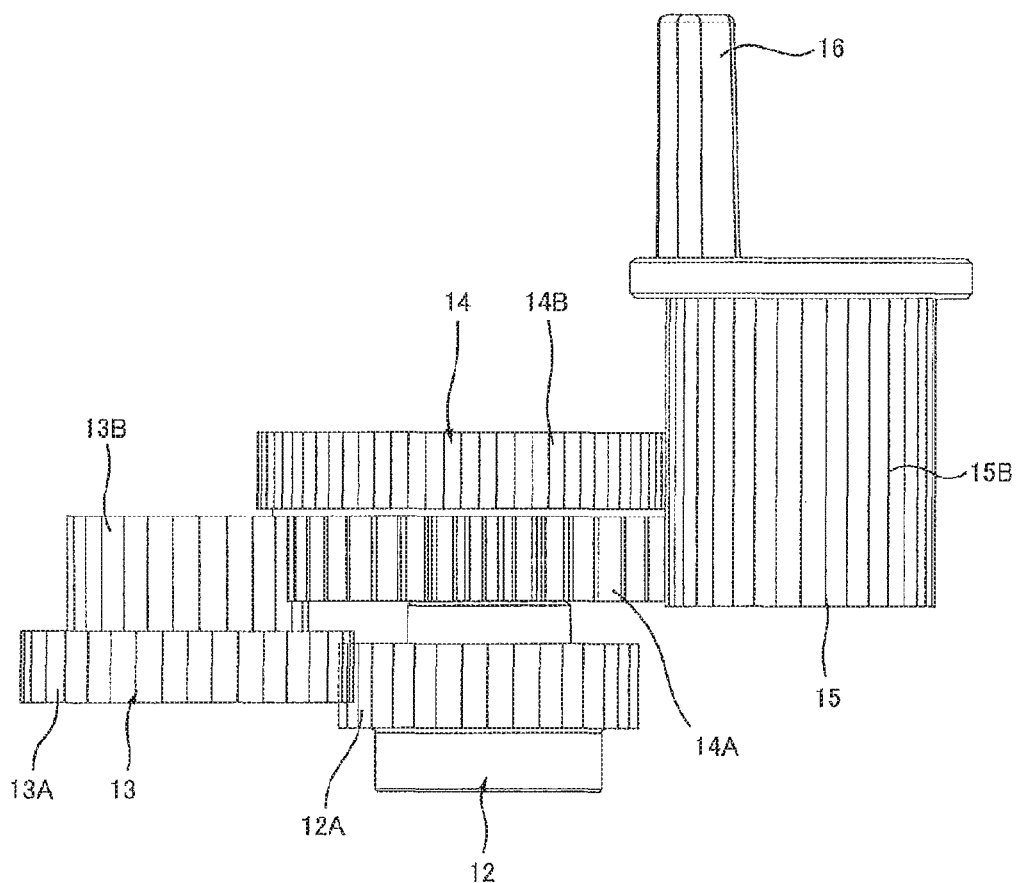
FIG. 6 is a view for explaining how an agitator gear, an idle gear, a first gear, and a second gear mesh with each other.

As illustrated in FIGS. 4, 5, and 6, the agitator gear 12 is positioned at an outer surface on the other side of the casing 2 in the predetermined direction. The agitator gear 12 is positioned opposite to the coupling 11 (see FIG. 3) with respect to the casing 2 in the predetermined direction. The agitator gear 12 is mounted to the agitator shaft 4A. The agitator shaft 4A includes one end portion and the other end portion in the predetermined direction. The other end portion of the agitator shaft 4A is positioned farther from the coupling 11 than the one end portion of the agitator shaft 4A from the coupling 11 in the predetermined direction. Specifically, the agitator gear 12 is mounted to the other end portion of the agitator shaft 4A.

The agitator gear 12 is rotatable together with the agitator shaft 4A. With this configuration, the agitator gear 12 is rotatable by receiving the drive force from the image forming apparatus. More specifically, the drive force inputted from the image forming apparatus to the coupling 11 (see FIG. 3) is transmitted to the agitator shaft 4A through the unillustrated gear train meshing with the coupling gear 11B and is further transmitted to the agitator gear 12 through the agitator shaft 4A. This configuration allows the agitator gear 12 to receive the drive force from the image forming apparatus for rotation. The agitator gear 12 includes a plurality of gear teeth 12A on a periphery of the agitator gear 12. The plurality of gear teeth 12A is arranged in a rotational direction of the agitator gear 12. The agitator gear 12 further includes a shaft part 21. The shaft part 21 is positioned at a center of the agitator gear 12 in a radial direction of the agitator gear 12. The shaft part 21 is positioned opposite to the casing 2 with respect to the plurality of gear teeth 12A of the agitator gear 12 in the predetermined direction. The shaft part 21 extends in the predetermined direction. The first gear 14 is attached to the shaft part 21.

1.3 Idle Gear 13

The idle gear 13 is a gear for transmitting the drive force from the agitator gear 12 to the first gear 14. The idle gear 13 is positioned at the outer surface of the other side of the casing 2 in the predetermined direction. The idle gear 13 is positioned opposite to the coupling 11 (see FIG. 3) with respect to the casing 2 in the predetermined direction. The idle gear 13 has a through hole 13C. The through hole 13C penetrates the idle gear 13 in the predetermined direction. A shaft 22 is provided at the outer surface of the other side of the casing 2. The shaft 22 is inserted into the through hole 13C. With this configuration, the idle gear 13 is mounted to the shaft 22. The idle gear 13 is rotatable about the shaft 22.

The idle gear 13 includes a large-diameter gear part 13A and a small-diameter gear part 13B. The large-diameter gear part 13A and the small-diameter gear part 13B are integrally formed. The large-diameter gear part 13A and the small-diameter gear part 13B are arranged in the predetermined direction. The small-diameter gear part 13B is positioned opposite to the casing 2 with respect to the large-diameter gear part 13A in the predetermined direction.

The large-diameter gear part 13A includes a plurality of gear teeth on a periphery of the large-diameter gear part 13A. The plurality of gear teeth of the large-diameter gear part 13A is arranged in a rotational direction of the idle gear 13. The large-diameter gear part 13A meshes with the agitator gear 12. Specifically, the plurality of gear teeth of the large-diameter gear part 13A meshes with the plurality of gear teeth 12A of the agitator gear 12. With this configuration, the idle gear 13 is rotatable by receiving the drive force from the agitator gear 12.

The small-diameter gear part 13B includes a plurality of gear teeth on a periphery of the small-diameter gear part 13B. The plurality of gear teeth of the small-diameter gear part 13B is arranged in the rotational direction of the idle gear 13. The small-diameter gear part 13B has an addendum circle whose diameter is smaller than a diameter of an addendum circle of the large-diameter gear part 13A. The number of gear teeth of the small-diameter gear part 13B is smaller than the number of gear teeth of the large-diameter gear part 13A. The small-diameter gear part 13B meshes with a small-diameter gear part 14A described later of the first gear 14. Specifically, the plurality of gear teeth of the small-diameter gear part 13B meshes with a plurality of gear teeth 14E of the small-diameter gear part 14A. This configuration allows the small-diameter gear part 13B to transmit the drive force to the first gear 14.

1.4 First Gear 14

The first gear 14 is positioned opposite to the casing 2 with respect to the plurality of gear teeth 12A of the agitator gear 12 in the predetermined direction. The first gear 14 has a through hole 14C. The through hole 14C penetrates the first gear 14 in the predetermined direction. The shaft part 21 of the agitator gear 12 is inserted into the through hole 14C. With this configuration, the first gear 14 is mounted to the shaft part 21. The first gear 14 is rotatable about the shaft part 21. The first gear 14 is rotatable about the first axis A1 extending in the predetermined direction. The first gear 14 includes the small-diameter gear part 14A and a large-diameter gear part 14B. The small-diameter gear part 14A and the large-diameter gear part 14B are integrally formed. The small-diameter gear part 14A and the large-diameter gear part 14B are arranged in the predetermined direction. The large-diameter gear part 14B is positioned opposite to the casing 2 with respect to the small-diameter gear part 14A in the predetermined direction.

The small-diameter gear part 14A is capable of meshing with the small-diameter gear part 13B of the idle gear 13. More in detail, the small-diameter gear part 14A includes the plurality of gear teeth 14E on a portion of a periphery of the small-diameter gear part 14A. The plurality of gear teeth 14E of the small-diameter gear part 14A meshes with the plurality of gear teeth of the small-diameter gear part 13B. The small-diameter gear part 14A includes a toothless part 14D where no gear teeth are provided. The plurality of gear teeth 14E is arranged in a rotational direction of the first gear 14. The toothless part 14D is aligned with the plurality of gear teeth 14E in the rotational direction of the first gear 14. The length of the toothless part 14D in the rotational direction of the first gear 14 is set to such a length that the meshing between the plurality of gear teeth 14E and the plurality of gear teeth of the small-diameter gear part 13B can be released. The first gear 14 can receive the drive force from the small-diameter gear part 13B while the plurality of gear teeth 14E of the small-diameter gear part 14A meshes with the plurality of gear teeth of the small-diameter gear part 13B. With this configuration, the first gear 14 is rotatable by receiving the drive force from the agitator gear 12 through the idle gear 13.

The first gear 14 is rotatable from a first position (see FIG. 7A) where the small-diameter gear part 14A and the small-diameter gear part 13B start meshing with each other to a second position (see FIG. 9) where the meshing between the small-diameter gear part 14A and the small-diameter gear part 13B is released. Here, the expression "the small-diameter gear part 14A and the small-diameter gear part 13B start meshing with each other" denotes that one of the plurality of gear teeth of the small-diameter gear part 13B contacts a furthest downstream gear tooth of the plurality of gear teeth 14E of the small-diameter gear part 14A in the rotational direction of the first gear 14. Further, the expression "the meshing between the small-diameter gear part 14A and the small-diameter gear part 13B is released" denotes that a furthest upstream gear tooth of the plurality of gear teeth 14E of the small-diameter gear part 14A in the rotational direction of the first gear 14 is separated from the small-diameter gear part 13B. That is, when the first gear 14 is positioned at the second position, the first gear 14 does not mesh with any of the plurality of gear teeth of the idle gear 13.

The number of the plurality of gear teeth 14E of the small-diameter gear part 14A is equal to or greater than 1.5 times as large as the number of a plurality of gear teeth of the second gear 15 described later. This configuration allows the second gear 15 described later to make 1.5 rotations while the first gear 14 rotates from the first position to the second position. The small-diameter gear part 14A has an addendum circle whose diameter is equal to or greater than 1.5 times as large as a diameter of an addendum circle of the second gear 15.

The large-diameter gear part 14B includes a plurality of gear teeth on a periphery of the large-diameter gear part 14B. The plurality of gear teeth is arranged in the rotational direction of the first gear 14. The large-diameter gear part 14B has an addendum circle whose diameter is greater than that of an addendum circle of the small-diameter gear part 14A.

1.5 Second Gear 15

The second gear 15 is positioned at the outer surface of the other side of the casing 2 in the predetermined direction. The second gear 15 is positioned opposite to the coupling 11 (see FIG. 3) with respect to the casing 2 in the predetermined direction. The second gear 15 has a through hole 15A. The through hole 15A penetrates the second gear 15 in the predetermined direction. A shaft 23 is provided at the outer surface of the other side of the casing 2. The shaft 23 is inserted into the through hole 15A. With this configuration, the second gear 15 is mounted to the shaft 23. The second gear 15 includes a plurality of gear teeth 15B on a periphery of the second gear 15. The plurality of gear teeth 15B is arranged in a rotational direction of the second gear 15. The second gear 15 meshes with the large-diameter gear part 14B of the first gear 14. Specifically, the plurality of gear teeth 15B of the second gear 15 meshes with the plurality of gear teeth of the large-diameter gear part 14B. With this configuration, the second gear 15 is rotatable about the shaft 23 by receiving the drive force from the first gear 14. The second gear 15 is rotatable about the second axis A2 extending in the predetermined direction.

1.6 Protrusion 16

The protrusion 16 is positioned opposite to the casing 2 with respect to the second gear 15 in the predetermined direction. The protrusion 16 is positioned around the through hole 15A. The protrusion 16 extends in the predetermined direction. The protrusion 16 extends from the second gear 15 in the predetermined direction. That is, the protrusion 16 is formed integrally with the second gear 15. With this configuration, the protrusion 16 can circularly move relative to the shaft 23 in accordance with the rotation of the second gear 15. In this embodiment, a single protrusion 16 is provided. However, as described later, a plurality of protrusions may be provided.

1.7 Gear Cover 17

As illustrated in FIG. 3, the gear cover 17 is positioned opposite to the coupling 11 with respect to the casing 2 in the predetermined direction. The gear cover 17 is attached to the outer surface of the other side of the casing 2 in the predetermined direction. The gear cover 17 covers the agitator gear 12, the idle gear 13, the first gear 14, and the second gear 15. The gear cover 17 has an opening 24. The opening 24 penetrates a wall of the gear cover 17 in a direction crossing the predetermined direction. The protrusion 16 and the shaft 23 are exposed to an outside of the gear cover 17 through the opening 24. With this configuration, the protrusion 16 can move past the opening 24 when circularly moving relative to the shaft 23. Note that the expression "the protrusion 16 can move past the opening 24"

denotes that the protrusion 16 is moved to a position outside the gear cover 17 through the opening 24 and then moved to a position inside the gear cover 17 through the opening 24 while circularly moving relative to the shaft 23.

2. Operation of Developing Cartridge 10

Next, an operation of the developing cartridge 10 will be described with reference to FIGS. 7A through 10.

Figure 7A:
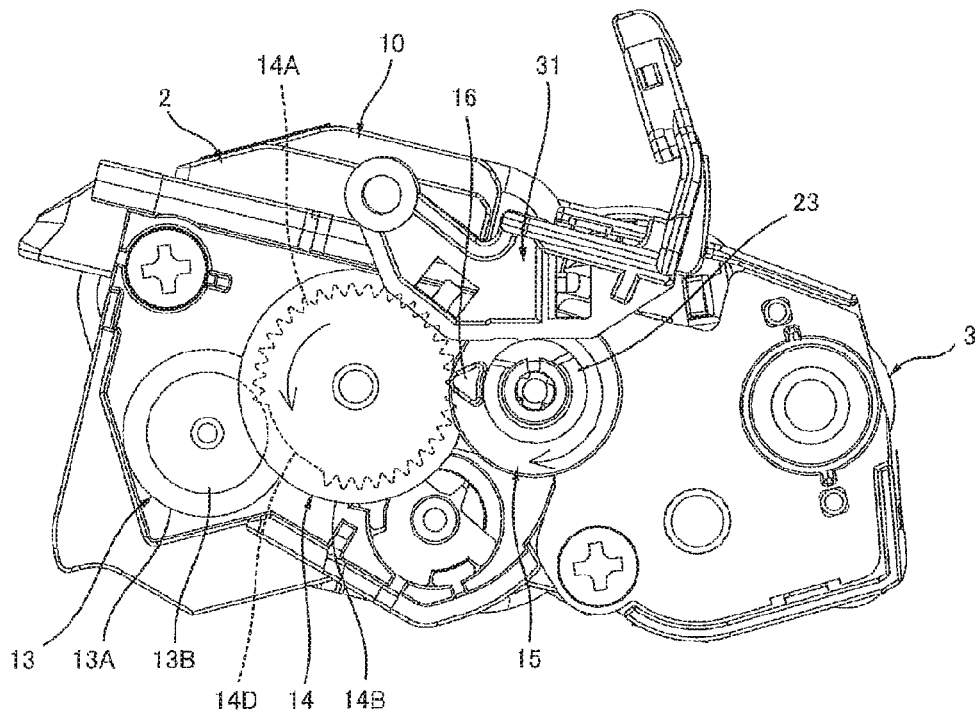
FIG. 7A is a view for explaining an operation of the developing cartridge according to the first embodiment, in which the first gear is positioned at a first position.
Figure 7B:
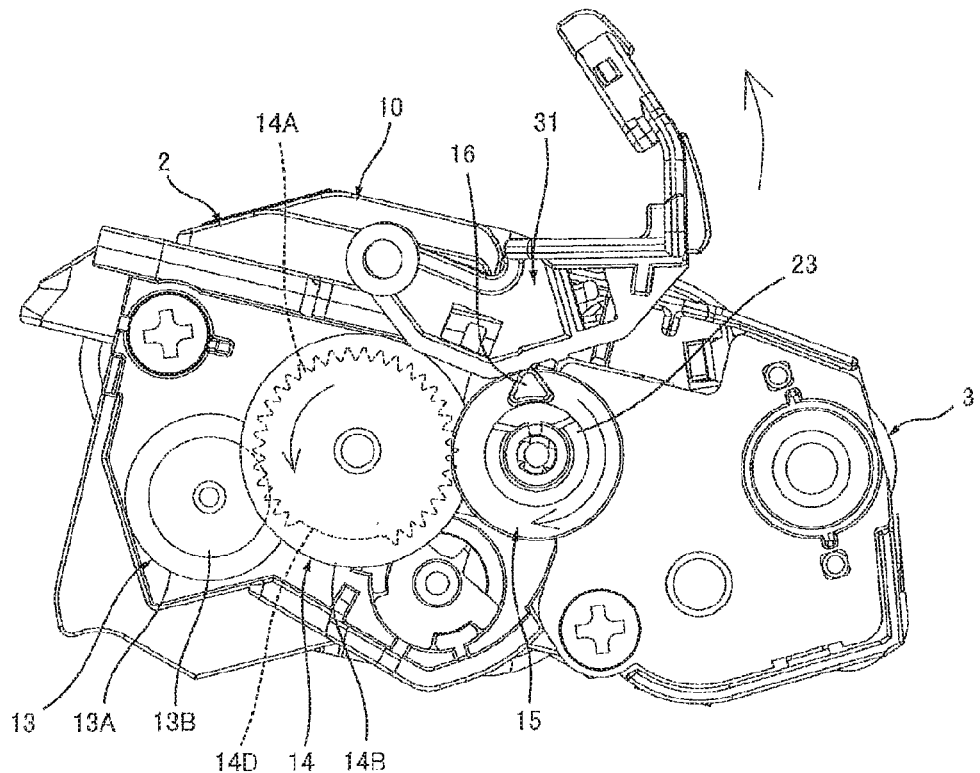
FIG. 7B is a view for explaining the operation of the developing cartridge according to the first embodiment, illustrating a state following a state illustrated in FIG. 7A, in which a protrusion has moved an actuator to a separated position.

When the developing cartridge 10 is attached to the image forming apparatus, an actuator 31 provided in the image forming apparatus contacts the shaft 23, as illustrated in FIG. 7A. The position of the actuator 31 illustrated in FIG. 7A is defined as a contact position. In this state, the first gear 14 is positioned at the first position.

Then, when the drive force input part of the image forming apparatus inputs a drive force to the coupling 11 (see FIG. 3), the drive force is transmitted from the coupling 11 to the agitator gear 12 through the unillustrated gear train and the agitator shaft 4A. This causes the agitator gear 12 to rotate, and the rotating agitator gear 12 causes the idle gear 13 meshing with the agitator gear 12 to rotate. Then, upon receipt of the drive force from the idle gear 13, the first gear 14 starts rotating. A time point when the first gear 14 starts rotating is defined as t0 (see FIG. 10).

When the first gear 14 rotates, the second gear 15 receives the drive force from the first gear 14 to start rotating. Then, the protrusion 16 circularly moves together with the rotation of the second gear 15 and moves along a peripheral surface of the shaft 23. In this state, the protrusion 16 moves outside the gear cover 17 through the opening 24 (see FIG. 3).

Then, the protrusion 16 abuts against the actuator 31 of the image forming apparatus at a time point t1 (see FIG. 10) to press the actuator 31 in a direction away from the shaft 23. Then, the actuator 31 moves from the contact position in the direction away from the shaft 23. Thus, the actuator 31 is positioned at a separated position illustrated in FIG. 7B.

Figure 8A:
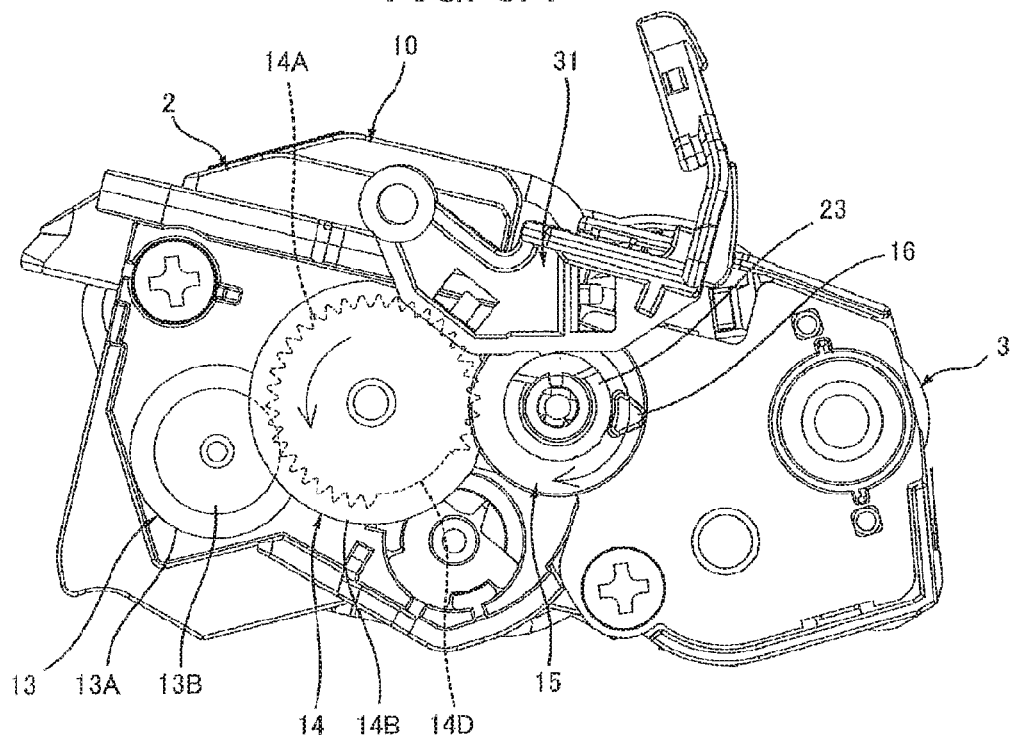
FIG. 8A is a view for explaining the operation of the developing cartridge according to the first embodiment, illustrating a state following the state illustrated in FIG. 7B, in which the protrusion has been separated from the actuator and the actuator has been moved to a contact position.

When the first gear 14 further rotates, the protrusion 16 passes between the shaft 23 and the actuator 31. The protrusion 16 moves away from the actuator 31 at a time point t2 (see FIG. 10). As a result of the separation of the protrusion 16 from the actuator 31, the actuator 31 moves from the separated position to the contact position. The actuator 31 is thus positioned at the contact position as illustrated in FIG. 8A.

Thereafter, the protrusion 16 moves to a position inside the gear cover 17 through the opening 24 (see FIG. 3). Thus, the protrusion 16 moves past the opening 24 once. The protrusion 16 moves the actuator 31 once from the contact position to the separated position while moving past the opening 24 once.

Figure 8B:
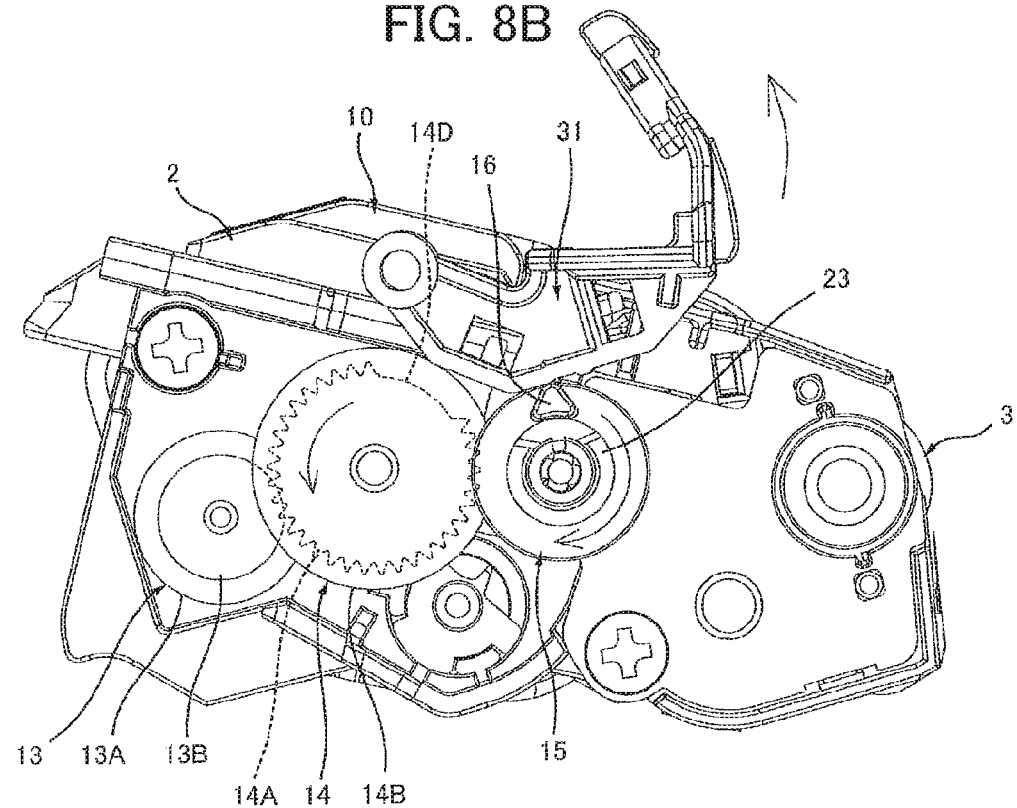
FIG. 8B is a view for explaining the operation of the developing cartridge according to the first embodiment, illustrating a state following the state illustrated in FIG. 8A, in which the protrusion has again moved the actuator to the separated position.

When the first gear 14 further rotates, the protrusion 16 passes between the shaft 23 and the actuator 31 again during a period from the time point t3 to the time point t4 (see FIG. 10), as illustrated in FIG. 8B. At this time, the protrusion 16 again moves past the opening 24 once. That is, while circularly moving together with the rotation of the second gear 15, the protrusion 16 moves past the opening 24 once and then further moves past the opening 24 at least once. The actuator 31 moves from the contact position to the separated position at the time point t3, and moves from the separated position to the contact position at the time point t4 after positioned at the separated position during a period from the time point t3 to the time point t4.

Figure 9:
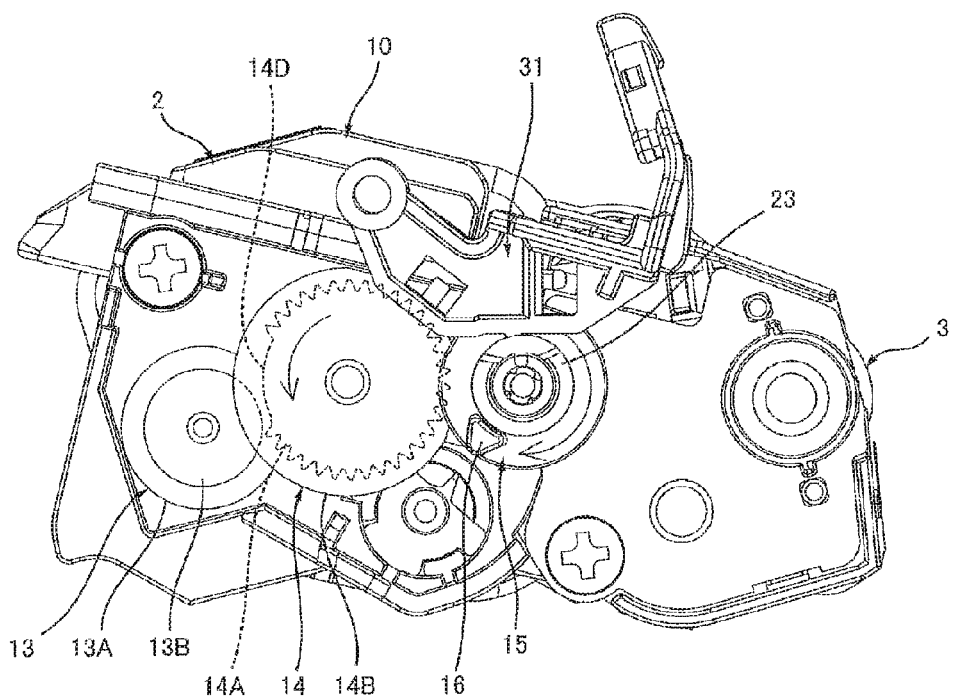
FIG. 9 is a view for explaining the operation of the developing cartridge according to the first embodiment, illustrating a state following the state illustrated in FIG. 8B, in which the first gear is positioned at a second position.
Figure 10:
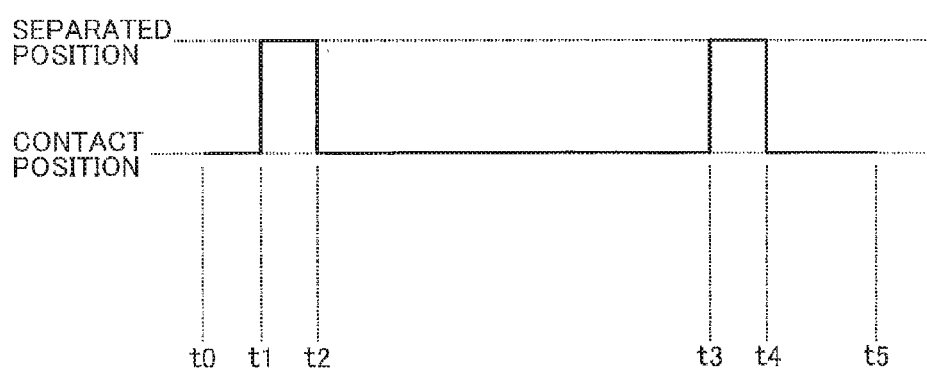
FIG. 10 is a timing chart illustrating movement of the actuator.

Thereafter, as illustrated in FIG. 9, the toothless part 14D of the first gear 14 faces the small-diameter gear part 13B of the idle gear 13 at a time point t5 (see FIG. 10). This arrangement releases the meshing between the small-diameter gear part 14A and the small-diameter gear part 13B to stop the rotation of the first gear 14. As the first gear 14 stops rotating, the rotation of the second gear 15 and the circular movement of the protrusion 16 also stop. More specifically, when the first gear 14 rotates from the first position to the second position and the meshing between the first gear 14 and idle gear 13 is released, the second gear 15 stops rotating. In this way, the protrusion 16 circularly moves in accordance with the rotation of the second gear 15 while the first gear 14 rotates from the first position to the second position, and stops moving when the second gear 15 stops rotating.

If the image forming apparatus detects that the actuator 31 is positioned at the separated position twice within a predetermined time period after the developing cartridge 10 is attached to the image forming apparatus, the image forming apparatus determines, for example, that the developing cartridge 10 is a new cartridge.

If the image forming apparatus detects that the actuator 31 is not positioned at the separated position twice within a predetermined time period after the developing cartridge 10 is attached to the image forming apparatus, the image forming apparatus determines, for example, that the developing cartridge 10 is a used cartridge.

3. Operational Advantages

As illustrated in FIGS. 7A through 9, while the first gear 14 rotates from the first position (see FIG. 7A) to the second position (see FIG. 9), the protrusion 16 circularly moves together with the rotation of the second gear 15. While moving together with the second gear 15, the protrusion 16 moves past the opening 24 once (see FIG. 3) and then further moves past the opening 24 at least once. In other words, while the first gear 14 rotates from the first position to the second position, the protrusion 16 moves past the opening 24 at least twice. Thereafter, the protrusion 16 stops moving when the second gear 15 stops rotating.

With the above-described configuration, a signal pattern generated in response to the movement of the protrusion 16 can be easily changed by changing the number of times that the single protrusion 16 moves past the opening 24.

4. Modifications to First Embodiment

The number of times that the single protrusion 16 moves past the opening 24 can be easily changed by, for example, adjusting a gear ratio between the first gear 14 and the second gear 15. The number of times that the single protrusion 16 moves past the opening 24 may be three times, or four times, for example.

The number of the protrusions 16 and the shape of the protrusions 16 are not limited to those described in the first embodiment.

Figure 11A:
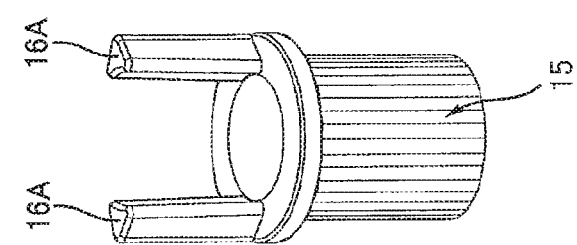
FIG. 11A is a perspective view of a protrusion according to a first modification to the first embodiment.
Figure 12A:
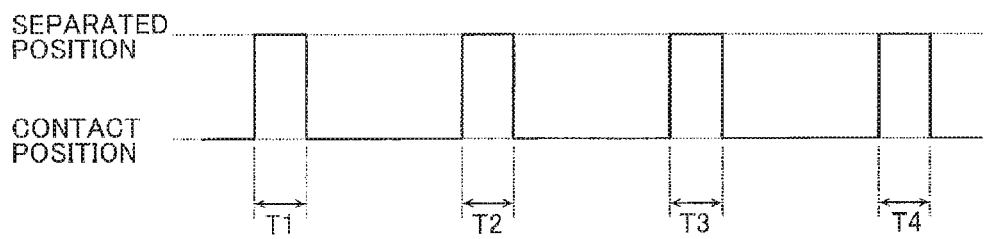
FIG. 12A is a timing chart illustrating movement of the actuator when the protrusion illustrated in FIG. 11A is rotated.

According to a first modification to the first embodiment illustrated in FIGS. 11A and 12A, two protrusions 16A may be provided. In this case, the two protrusions 16A are arranged spaced apart from each other in the rotational direction of the second gear 15.

In this case, as illustrated in FIG. 12A, one of the two protrusions 16A (hereinafter referred to as "first protrusion 16A") causes the actuator 31 to be positioned at the separated position during a time period T1, and then the other of the two protrusions 16A (hereinafter referred to as "second protrusion 16A") causes the actuator 31 to be positioned at the separated position during a time period T2. Thereafter, again, the first protrusion 16A causes the actuator 31 to be positioned at the separated position during the time period T3, and then the second protrusion 16A causes the actuator 31 to be positioned at the separated position during the time period T4.

Figure 11B:
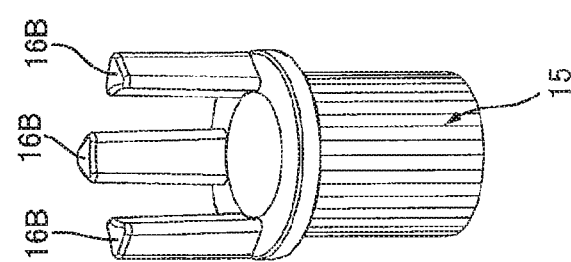
FIG. 11B is a perspective view of a protrusion according to a second modification to the first embodiment.
Figure 12B:
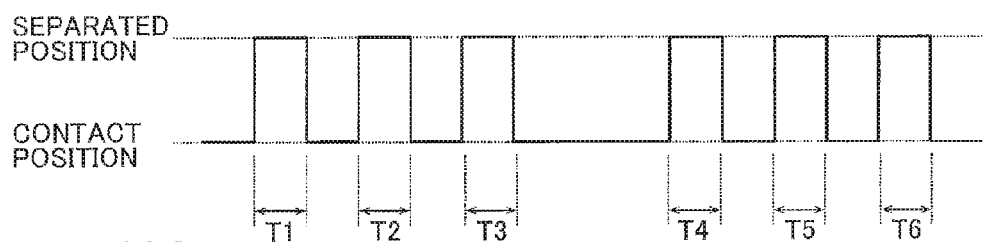
FIG. 12B is a timing chart illustrating movement of the actuator when the protrusion illustrated in FIG. 11B is rotated.

According to a second modification to the first embodiment illustrated in FIGS. 11B and 12B, three protrusions 16B may be provided. Similar to the first modification, the three protrusions 16B are arranged spaced apart from each other in the rotational direction of the second gear 15.

Further, similar to the first modification, as illustrated in FIG. 12B, one of the three protrusions 16B (hereinafter referred to as "first protrusion 16B") causes the actuator 31 to be positioned at the separated position during a time period T1, and then another protrusion 16B (hereinafter referred to as "second protrusion 16B") causes the actuator 31 to be positioned at the separated position during a time period T2, and then the other protrusion 16B (hereinafter referred to as "third protrusion 16B") causes the actuator 31 to be positioned at the separated position during a time period T3.

Thereafter, again, the first protrusion 16B causes the actuator 31 to be positioned at the separated position during the time period T4, and then the second protrusion 16B causes the actuator 31 to be positioned at the separated position during the time period T5, and then the third protrusion 16B causes the actuator 31 to be positioned at the separated position during the time period T6.

Figure 11C:
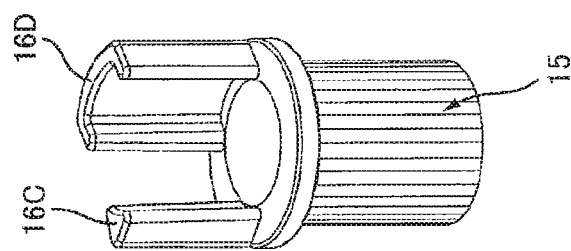
FIG. 11C is a perspective view of a protrusion according to a third modification to the first embodiment.
Figure 12C:
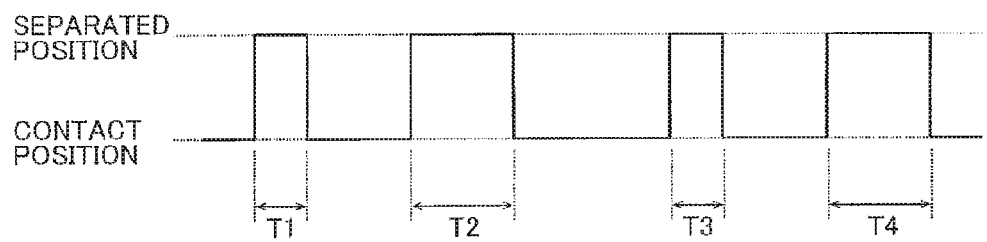
FIG. 12C is a timing chart illustrating movement of the actuator when the protrusion illustrated in FIG. 11C is rotated.

Further, according to a third modification to the first embodiment illustrated in FIGS. 11C and 12C, a first protrusion 16C and a second protrusion 16D may be provided. The second protrusion 16D has a length in the rotational direction of the second gear 15 greater than that of the first protrusion 16C. The first protrusion 16C and the second protrusion 16D are spaced apart from each other in the rotational direction of the second gear 15.

In this case, a time period T2, T4 (see FIG. 12C) during which the actuator 31 is positioned at the separated position by contact with the second protrusion 16D is longer than the time period T2, T4 (see FIG. 12A) during which the actuator 31 is positioned at the separated position by contact with the second protrusion 16A of FIG. 11A.

With this configuration, for example, the image forming apparatus may determine that a developing cartridge currently attached thereto has a specification in which a developer storage capacity is small when the time period T2, T4 is short, and may determine that the developing cartridge has a specification in which the developer storage capacity is large when the time period T2, T4 is long.

Figure 11D:
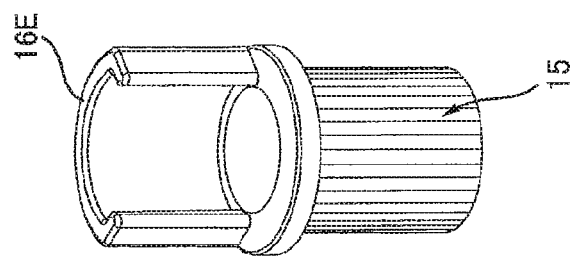
FIG. 11D is a perspective view of a protrusion according to a fourth modification to the first embodiment.
Figure 12D:
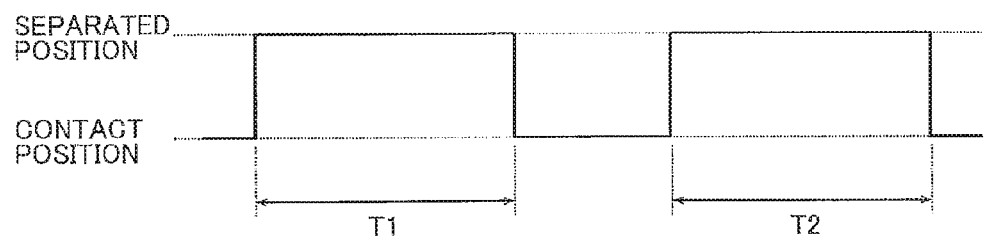
FIG. 12D is a timing chart illustrating movement of the actuator when the protrusion illustrated in FIG. 11D is rotated.

Further, according to a fourth modification to the first embodiment illustrated in FIGS. 11D and 12D, a single protrusion 16E may be provided. The protrusion 16E is elongated in the rotational direction of the second gear 15. In this case, a time period T1, T2 (see FIG. 12D) during which the actuator 31 is positioned at the separated position is longer than the time period during which the actuator 31 is positioned at the separated position by contact with the protrusion 16 illustrated in FIG. 5.

Similar to the case illustrated in FIGS. 11C and 12C, in the fourth modification, the image forming apparatus may determine that a developing cartridge currently attached thereto has a specification in which a developer storage capacity is small when the time period T1, T2 is short, and may determine that the developing cartridge has a specification in which the developer storage capacity is large when the time period T1, T2 is long, for example.

Note that whether the developing cartridge 10 is new or used and the developer storage capacity described above are each an example of information of the developing cartridge 10. A signal pattern generated by the movement of the protrusion 16 may indicate any information of the developing cartridge 10 other than whether the developing cartridge 10 is new or used and the developer storage capacity, if desired.

Second Embodiment

Figure 13:
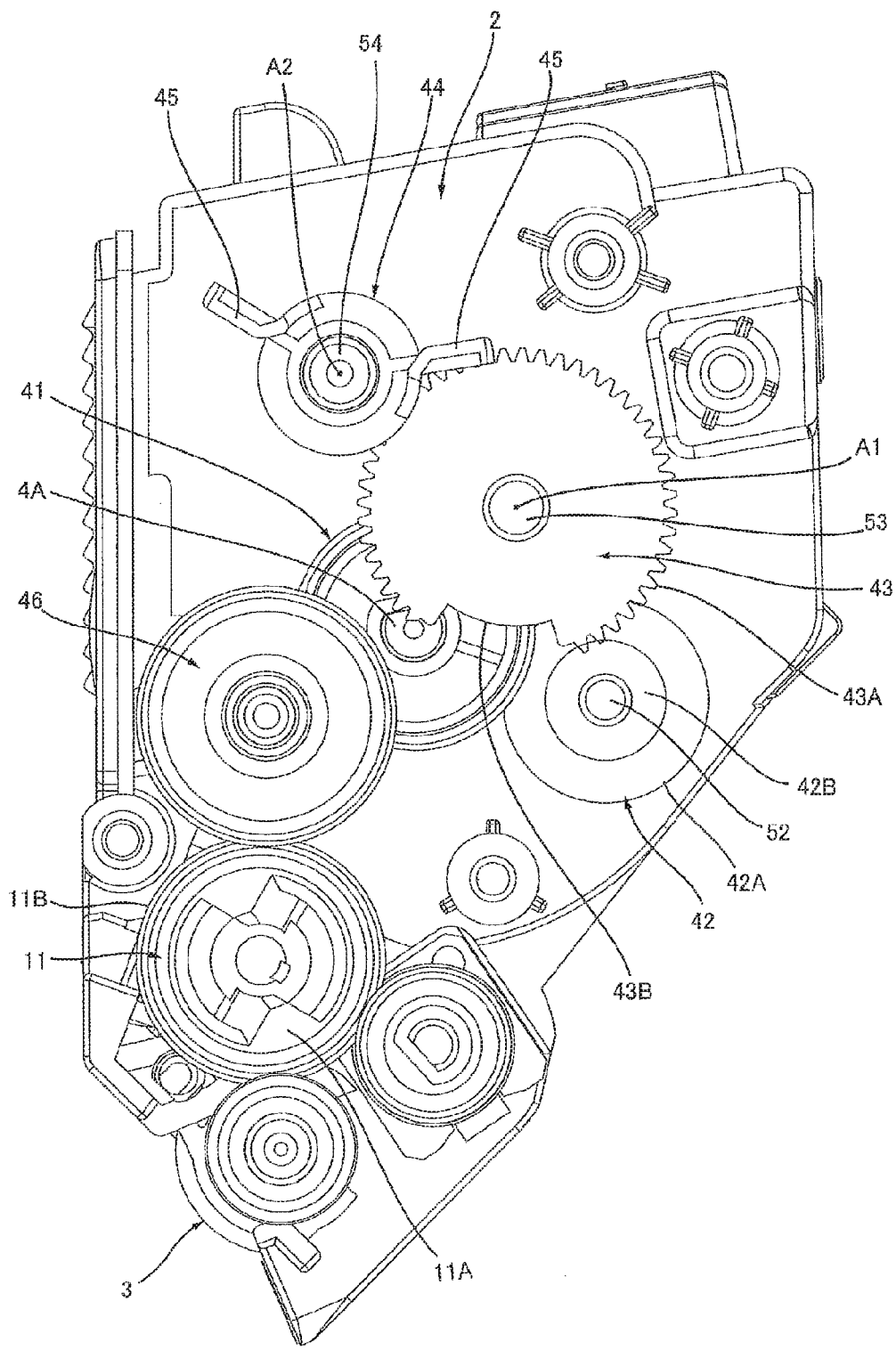
FIG. 13 is a side view of a developing cartridge according to a second embodiment, particularly illustrating a gear train provided in the developing cartridge according to the second embodiment.
Figure 14:
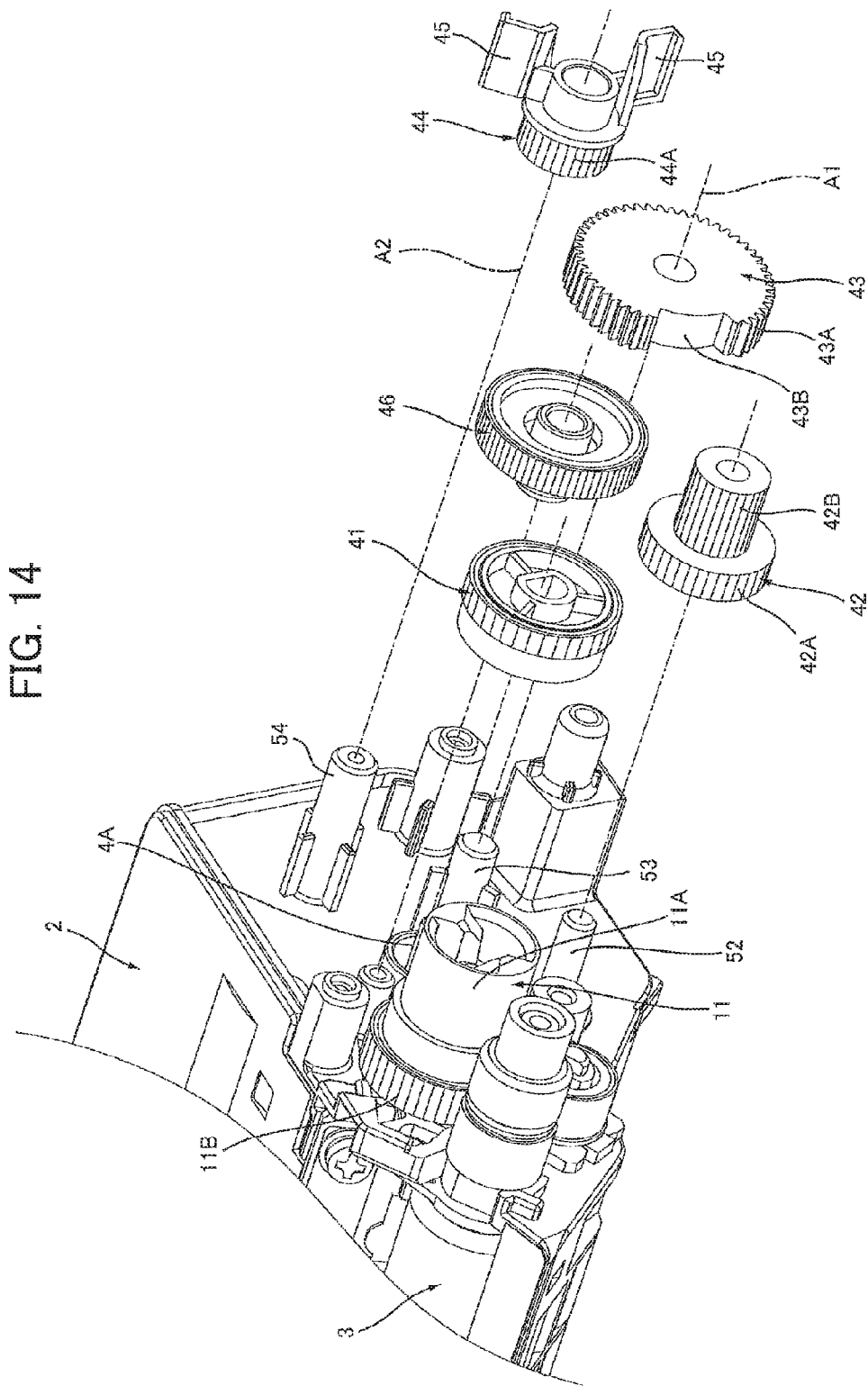
FIG. 14 is an exploded perspective view of the gear train illustrated in FIG. 13.

A developing cartridge 40 according to a second embodiment will be described with reference to FIGS. 13 and 14, wherein like parts and components are designated by the same reference numerals as those of the above-described embodiment to avoid duplicating description.

The developing cartridge 40 includes an agitator gear 41, an idle gear 42, a first gear 43, a second gear 44, two protrusions 45, and an idle gear 46. The agitator gear 41, the idle gear 42, the first gear 43, the second gear 44, the two protrusions 45, and the idle gear 46 are positioned at the outer surface of the one side of the casing 2 in the predetermined direction. That is, the agitator gear 41, the idle gear 42, the first gear 43, the second gear 44, the two protrusions 45, and the idle gear 46 are positioned on the same side of the casing 2 as the coupling 11 in the predetermined direction.

The agitator gear 41 is mounted to the one end portion of the agitator shaft 4A. The agitator gear 41 is rotatable together with the agitator shaft 4A. The agitator gear 41 can receive a drive force from the coupling 11 through the idle gear 46. With this configuration, the agitator gear 41 is rotatable by receiving the drive force from the image forming apparatus.

The idle gear 42 is a gear for transmitting the drive force from the agitator gear 41 to the first gear 43. The idle gear 42 is mounted to a shaft 52 provided at the outer surface of the one side of the casing 2. The idle gear 42 is rotatable about the shaft 52.

The idle gear 42 includes a large-diameter gear part 42A and a small-diameter gear part 42B. The large-diameter gear part 42A includes a plurality of gear teeth on a periphery of the large-diameter gear part 42A. The small-diameter gear part 42B includes a plurality of gear teeth on a periphery of the small-diameter gear part 42B. The small-diameter gear part 42B has an addendum circle whose diameter is smaller than a diameter of an addendum circle of the large-diameter gear part 42A. The number of gear teeth of the small-diameter gear part 42B is smaller than the number of gear teeth of the large-diameter gear part 42A. The large-diameter gear part 42A and the small-diameter gear part 42B are formed integrally. The large-diameter gear part 42A and the small-diameter gear part 42B are arranged in the predetermined direction. The small-diameter gear part 42B is positioned opposite to the casing 2 with respect to the large-diameter gear part 42A in the predetermined direction. The large-diameter gear part 42A meshes with the agitator gear 41. With this configuration, the idle gear 42 is rotatable by receiving the drive force from the agitator gear 41. The small-diameter gear part 42B meshes with the first gear 43. This configuration allows the small-diameter gear part 42B to transmit the drive force to the first gear 43.

The first gear 43 is mounted to a shaft 53 provided at the outer surface of the one side of the casing 2. The first gear 43 is rotatable about the shaft 53 extending in the predetermined direction. The first gear 43 is capable of meshing with the small-diameter gear part 42B of the idle gear 42.

The first gear 43 includes a plurality of gear teeth 43A on a portion of a periphery of the first gear 43. The plurality of gear teeth 43A is arranged in a rotational direction of the first gear 43. The plurality of gear teeth 43A meshes with the plurality of gear teeth of the small-diameter gear part 42B.

The first gear 43 includes a toothless part 43B where no gear teeth are provided. The toothless part 43B is aligned with the plurality of gear teeth 43A in the rotational direction of the first gear 43. The length of the toothless part 43B in the rotational direction of the first gear 43 is set to such a length that the meshing between the plurality of gear teeth 43A and the plurality of gear teeth of the small-diameter gear part 42B can be released. The first gear 43 can receive the drive force from the small-diameter gear part 42B while the plurality of gear teeth 43A of the first gear 43 meshes with the plurality of gear teeth of the small-diameter gear part 42B. With this configuration, the first gear 43 can rotate by receiving the drive force from the agitator gear 41 through the idle gear 42.

The first gear 43 is rotatable from a first position (see FIG. 13) where the first gear 43 starts meshing with the small-diameter gear part 42B to a second position where the meshing between the first gear 43 and the small-diameter gear part 42B is released. The number of the plurality of gear teeth 43A of the first gear 43 is equal to or greater than 1.5 times as large as the number of a plurality of gear teeth 44A of the second gear 44. This allows the second gear 44 to make 1.5 rotations while the first gear 43 rotates from the first position to the second position. The first gear 43 has an addendum circle whose diameter is equal to or greater than 1.5 times as large as a diameter of an addendum circle of the second gear 44.

The second gear 44 is mounted to a shaft 54 provided at the outer surface of the one side of the casing 2. The second gear 44 includes the plurality of gear teeth 44A on a periphery of the second gear 44. The plurality of gear teeth 44A is arranged in a rotational direction of the second gear 44. The plurality of gear teeth 44A meshes with the plurality of gear teeth 43A of the first gear 43. With this configuration, the second gear 44 is rotatable about the shaft 54 by receiving the drive force from the first gear 43. The second gear 44 is rotatable about the second axis A2 extending in the predetermined direction.

The two protrusions 45 are positioned opposite to the casing 2 with respect to the second gear 44 in the predetermined direction. The two protrusions 45 are formed integrally with the second gear 44. Specifically, the two protrusions 45 extend from the second gear 44, respectively. Thus, the two protrusions 45 can circularly move relative to the shaft 54 together with the rotation of the second gear 44. The two protrusions 45 extend in the predetermined direction. The two protrusions 45 are spaced apart from each other in the rotational direction of the second gear 44.

In the second embodiment, a gear cover (not illustrated) is attached to the outer surface of the one side of the casing 2 in the predetermined direction. The gear cover has an opening (not illustrated). The two protrusions 45 moves past the opening of the gear cover when circularly moving relative to the shaft 54. While the first gear 43 rotates from the first position to the second position, the two protrusions 45 move past the opening of the gear cover once and then further move past the opening at least once.

The developing cartridge 40 according to the second embodiment can obtain the same operational advantages described in the first embodiment.

Third Embodiment

A developing cartridge 60 according to a third embodiment will be described with reference to FIGS. 15 through 17, wherein like parts and components are designated by the same reference numerals as those of the above-described embodiments to avoid duplicating description.

1. Structure of Developing Cartridge 60

Figure 15:
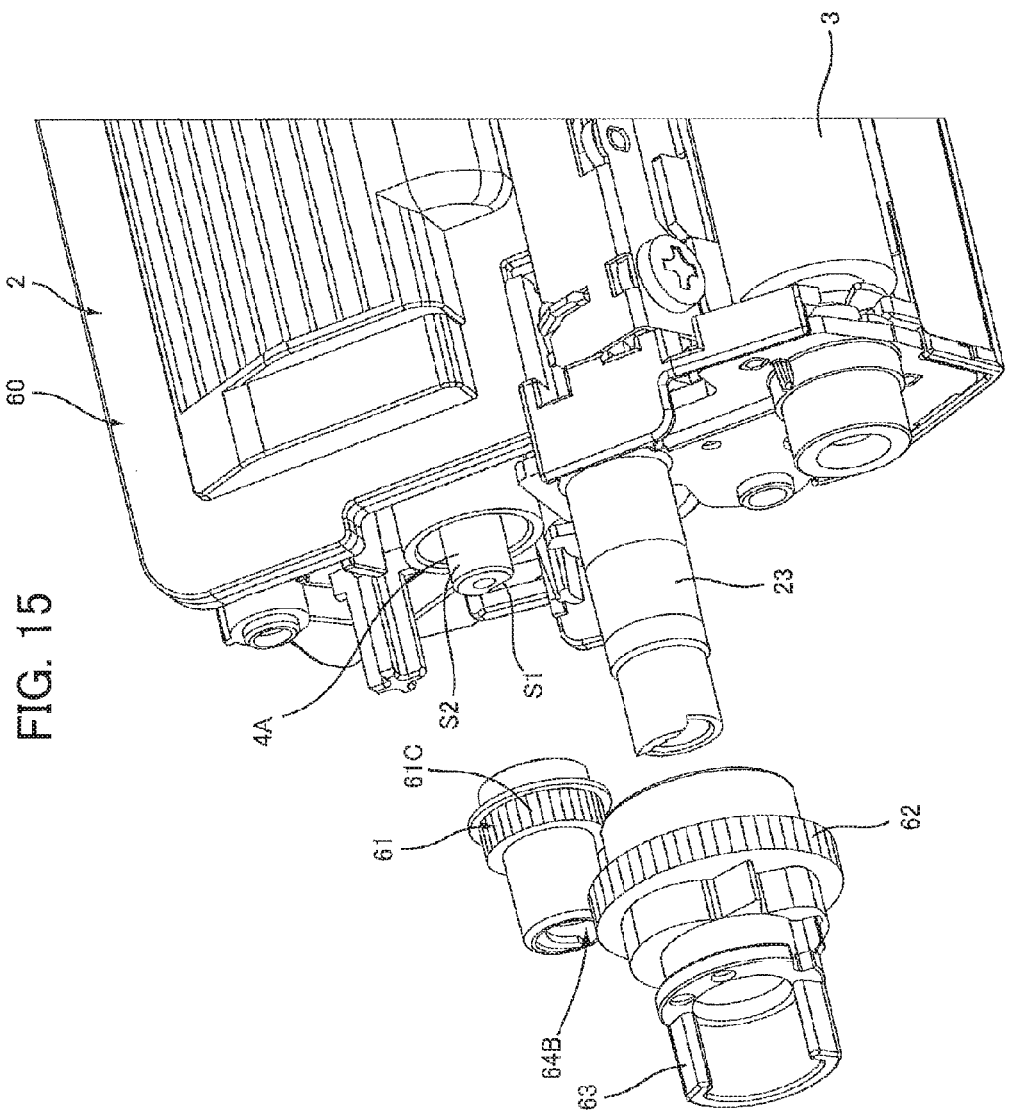
FIG. 15 is an exploded perspective view of a gear train provided in a developing cartridge according to a third embodiment.

As illustrated in FIG. 15, the developing cartridge 60 includes a first gear 61 and a second gear 62. The first gear 61 is capable of meshing with the second gear 62. The first gear 61 can move in the predetermined direction from a first position (see FIG. 16) to a second position (see FIG. 17). When the first gear 61 is positioned at the first position, the first gear 61 meshes with the second gear 62. When the first gear 61 is positioned at the second position, the meshing between the first gear 61 and the second gear 62 is released.

Specifically, as illustrated in FIG. 15, the first gear 61 includes one end portion and the other end portion in the predetermined direction. The other end portion of the first gear 61 is positioned opposite to the casing 2 with respect to the one end portion of the first gear 61 in the predetermine direction. The first gear 61 has a first hole 64A and a second hole 64B, as illustrated in FIGS. 16 and 17. The first hole 64A is recessed from the one end portion of the first gear 61 toward the other end portion of the first gear 61 in the predetermined direction. The second hole 64B is recessed from the other end portion of the first gear 61 toward the one end portion of the first gear 61 in the predetermined direction. The first hole 64A and the second hole 64B may be in communication with each other.

The other end portion of the agitator shaft 4A is inserted into the first hole 64A. Thus, the first gear 61 is mounted to the other end portion of the agitator shaft 4A. The other end portion of the agitator shaft 4A is D-shaped as viewed in the predetermined direction. Specifically, a portion of a peripheral surface of the other end portion of the agitator shaft 4A is formed into a flat surface 51, and the remaining part is formed into an arcuate surface S2 (see FIG. 15). The first hole 64A has a shape in conformance with the shape of the other end portion of the agitator shaft 4A. With this configuration, in a state where the other end portion of the agitator shaft 4A is inserted into the first hole 64A, the first gear 61 is rotatable together with the rotation of the agitator shaft 4A. Further, the first gear 61 can move in the predetermined direction relative to the agitator shaft 4A.

Figure 16:
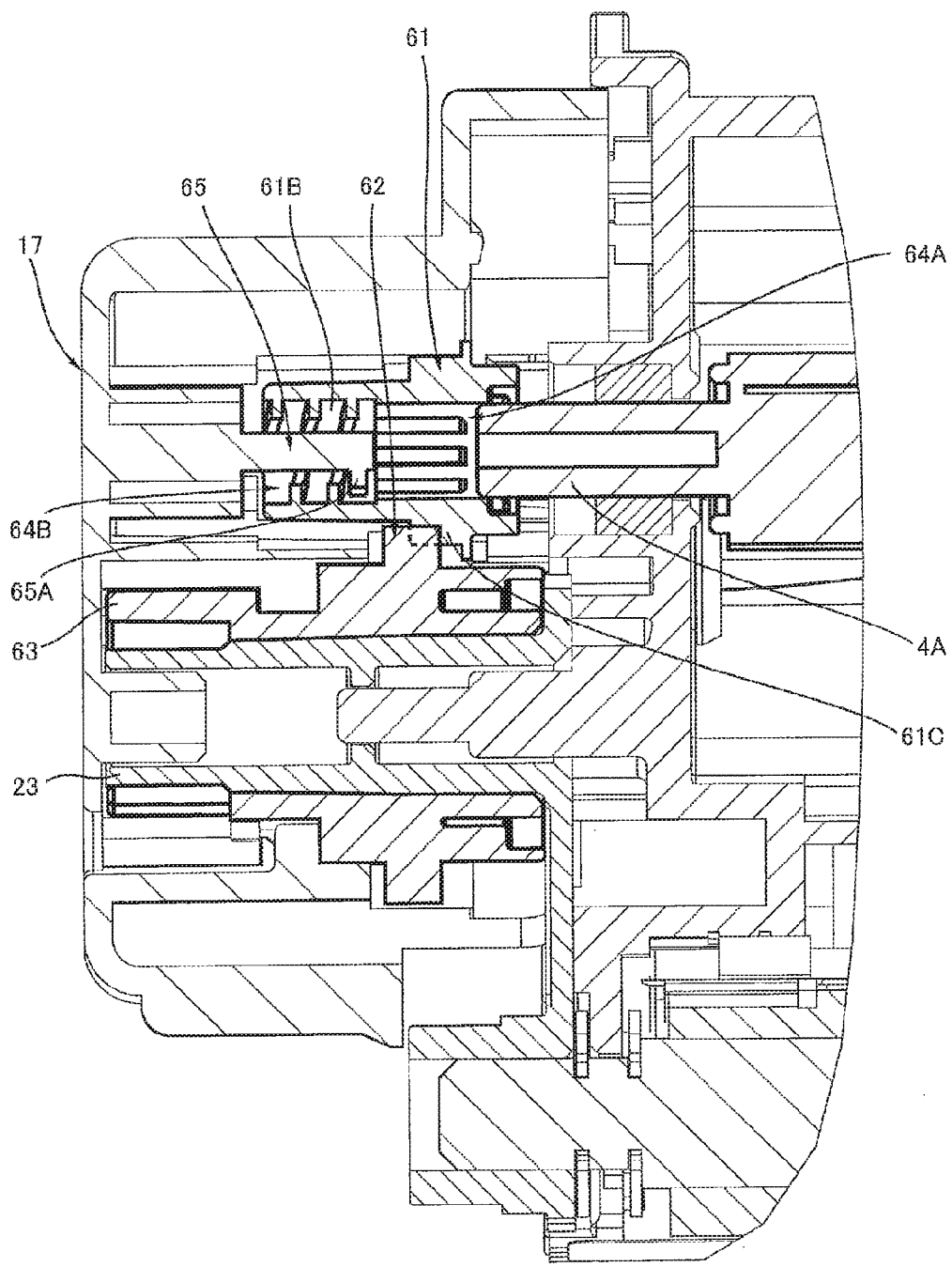
FIG. 16 is a view for explaining how a first gear is moved, in which the first gear is positioned at a first position.

As illustrated in FIG. 16, a shaft 65 is provided at the gear cover 17. The shaft 65 is inserted into the second hole 64B. The shaft 65 is positioned opposite to the casing 2 with respect to the agitator shaft 4A in the predetermined direction. The shaft 65 is spaced apart from the agitator shaft 4A in the predetermined direction. The shaft 65 is formed integrally with the gear cover 17. Specifically, the shaft 65 extends from an inner surface of the gear cover 17 toward the agitator shaft 4A in the predetermined direction. The shaft 65 includes one end portion connected to the gear cover 17 and the other end portion positioned closer to the agitator shaft 4A than the one end portion of the shaft 65 to the agitator shaft 4A. The shaft 65 includes a projection 65A. The projection 65A is positioned at the other end portion of the shaft 65. The projection 65A projects from a peripheral surface of the shaft 65. The projection 65A extends in a radial direction of the shaft 65.

The first gear 61 further includes a groove 61B. The groove 61B is formed in an inner surface of the second hole 64B. The groove 61B has a helical shape whose axis extends in the predetermined direction. The groove 61B includes one end portion and the other end portion in the predetermined direction. The other end portion of the groove 61B is positioned opposite to the casing 2 with respect to the one end portion of the groove 61B.

In a state where the first gear 61 is positioned at the first position, the projection 65A of the shaft 65 is engaged with the one end portion of the groove 61B. Since the projection 65A is engaged with the helical-shaped groove 61B, the first gear 61 can move in the predetermined direction when rotating. Specifically, when rotating, the first gear 61 can move in a direction approaching the casing 2. Incidentally, if the rotational direction of the first gear 61 in this embodiment is reversed, the helical direction of the groove 61B should also be reversed. Accordingly, the first gear 61 can move in the direction approaching the casing 2 when rotating.

Further, the first gear 61 has a plurality of gear teeth 61C. The plurality of gear teeth 61C is positioned on a peripheral surface of the first gear 61. The plurality of gear teeth 61C is arranged in the rotational direction of the first gear 61. The plurality of gear teeth 61C meshes with a plurality of gear teeth of the second gear 62. That is, the first gear 61 meshes with the second gear 62. With this configuration, the second gear 62 is rotatable together with a protrusion 63 by receiving a drive force from the first gear 61.

2. Operation of Developing Cartridge 60

Similar to the first embodiment, the actuator 31 (see FIG. 7A) contacts the shaft 23 when the developing cartridge 60 is attached to the image forming apparatus. Further, at this time, the first gear 61 is positioned at the first position, as illustrated in FIG. 16.

When a drive force is inputted into the coupling 11 (see FIG. 3) from the image forming apparatus, the drive force is transmitted from the coupling 11 to the first gear 61 through a gear train (not illustrated) and the agitator shaft 4A. This causes the first gear 61 to rotate. Upon receipt of the drive force from the first gear 61, the second gear 62 starts rotating. Further, the protrusion 63 circularly moves in accordance with the rotation of the second gear 62 and moves along the peripheral surface of the shaft 23.

Since the projection 65A is engaged with the one end portion of the groove 61B, the first gear 61 moves in the direction approaching the casing 2 by the rotation of the first gear 61. On the other hand, the second gear 62 rotates but does not move in the predetermined direction.

With this configuration, the meshing between the first gear 61 and the second gear 62 is released in accordance with the movement of the first gear 61 in the predetermined direction. As a result, the second gear 62 stops rotating. Accordingly, the protrusion 63 also stops circularly moving. Note that the timing at which the meshing between the first gear 61 and the second gear 62 is released is adjusted in such a way that the protrusion 63 moves past the opening 24 at least once after moves past the opening 24 once.

Figure 17:
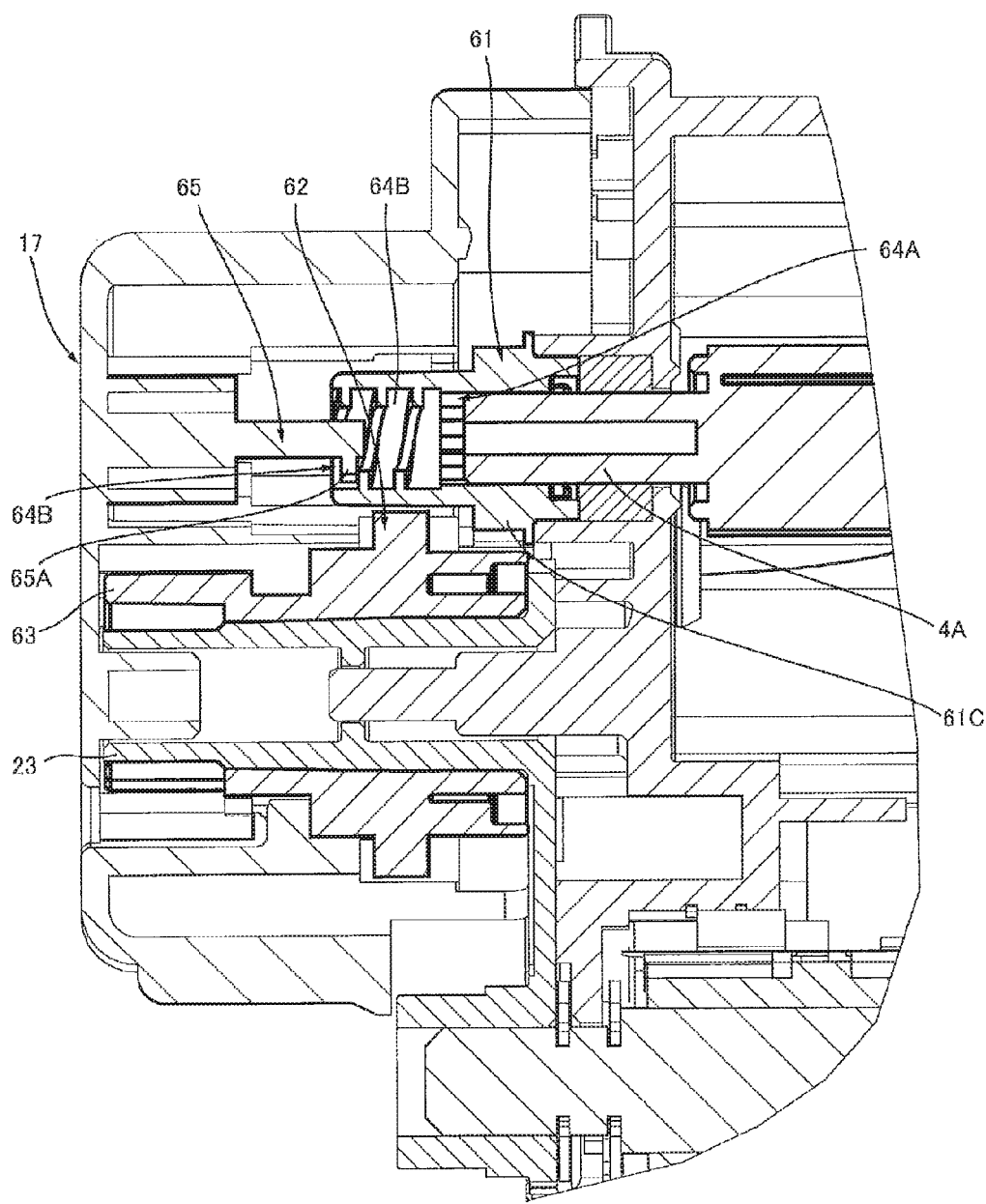
FIG. 17 is a view for explaining how the first gear is moved, in which the first gear is positioned at a second position.

Then, as illustrated in FIG. 17, when the first gear 61 moves to a position at which the projection 65A of the shaft 65 is moved to the other end portion of the groove 61B, the movement of the first gear 61 in the predetermined direction is stopped. The position of the first gear 61 in this state is the second position. In the third embodiment, the first gear 61 is rotatable together with the agitator shaft 4A when the first gear 61 is positioned at the second position.

The developing cartridge 60 according to the third embodiment can obtain the same operational advantages described in the first embodiment.

3. Modification to Third Embodiment

Figure 18:
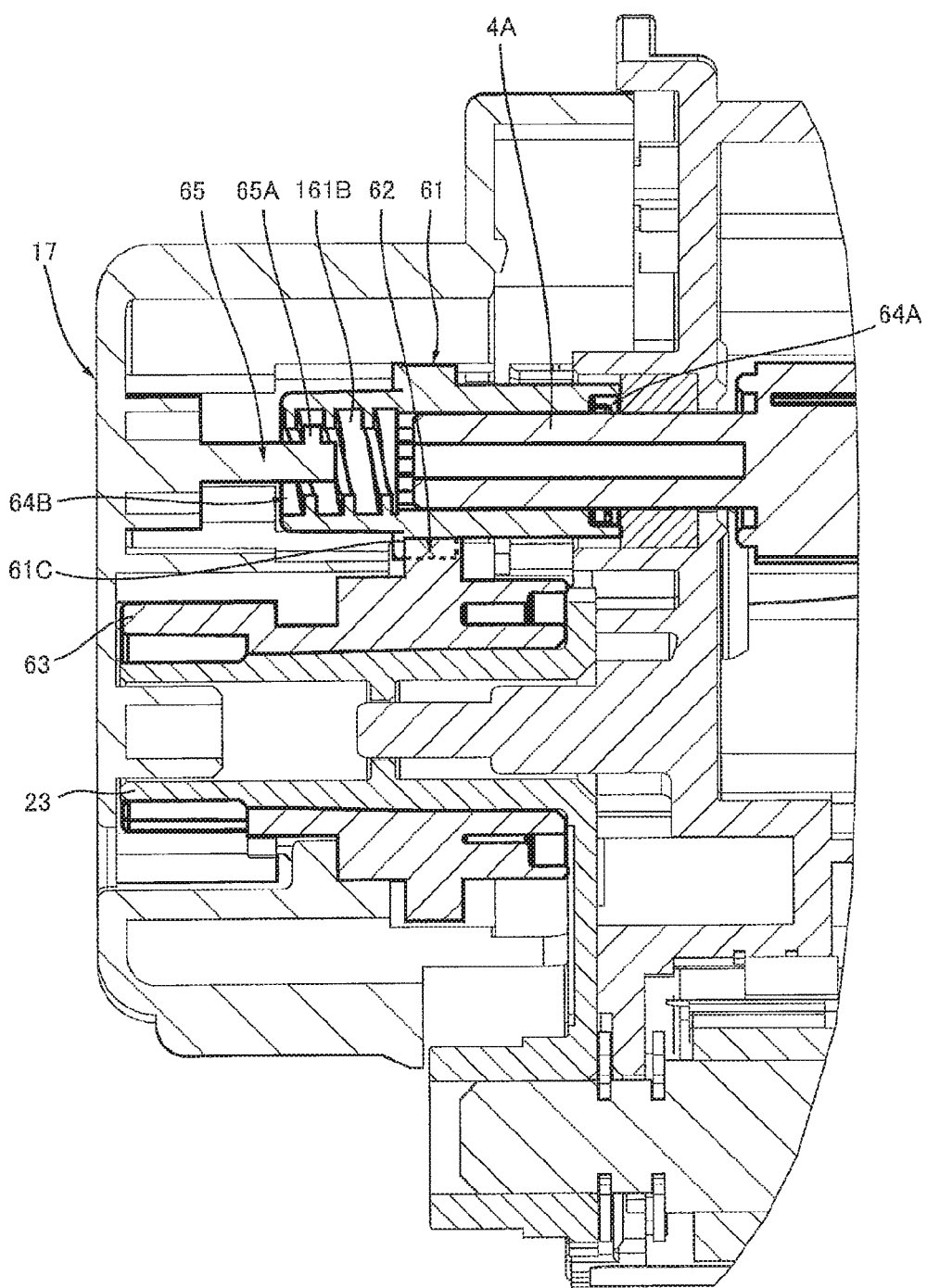
FIG. 18 is a view for explaining a modification to the third embodiment, in which a first gear is positioned at a first position.
Figure 19:
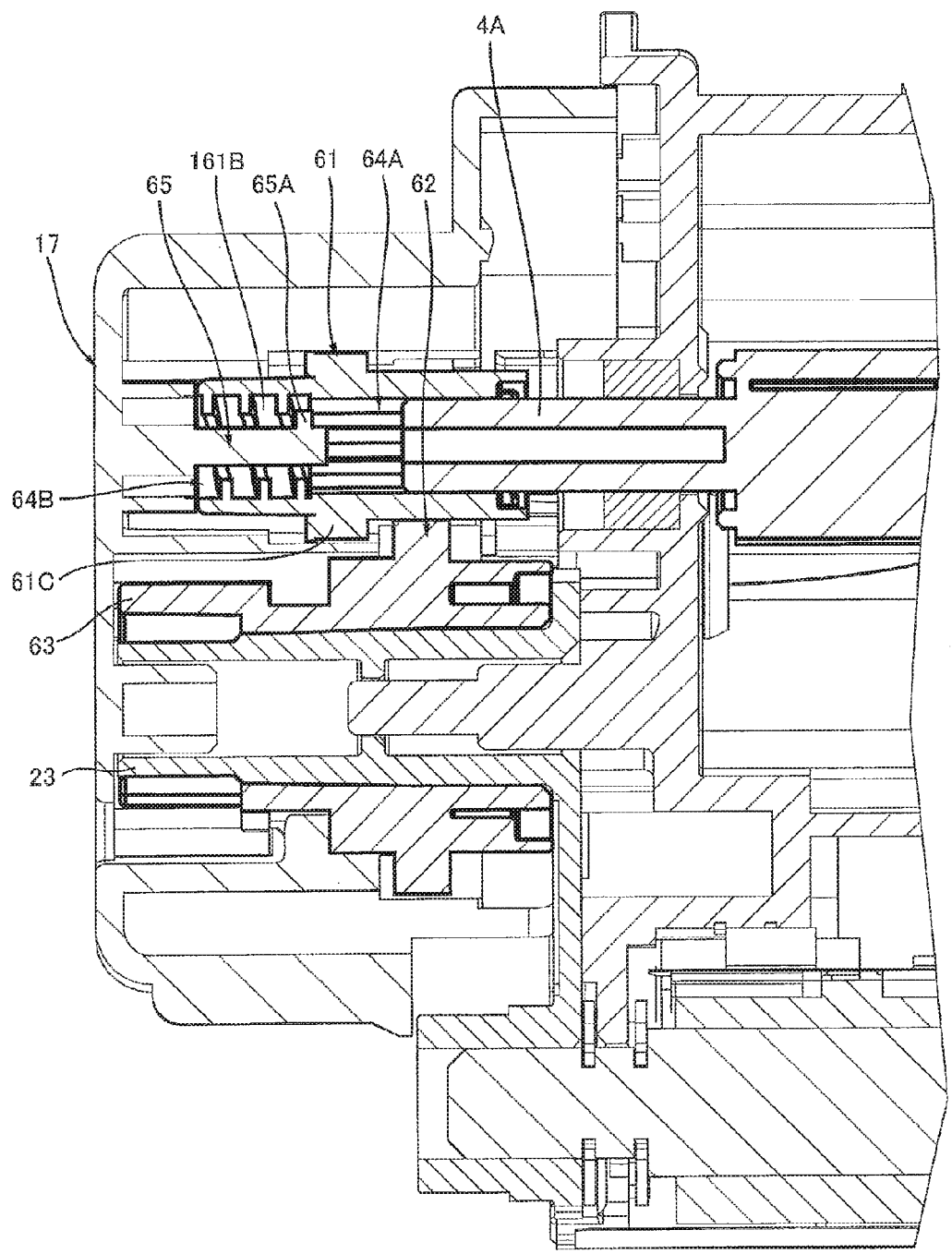
FIG. 19 is a view for explaining the modification to the third embodiment, in which the first gear is positioned at a second position.

As illustrated in FIGS. 18 and 19, to release the meshing with the second gear 62, the first gear 61 may move in a direction away from the casing 2 when rotating. More in detail, a groove 161B of the first gear 61 according to this modification has a helical shape that extends in a direction opposite to the helical direction of the groove 61B illustrated in FIG. 16. Thus, when rotating, the first gear 61 moves in a direction away from the casing 2. Incidentally, if the rotational direction of the first gear 61 according to this modification is reversed, the helical direction of the groove 161B should also be reversed. As a result, when rotating, the first gear 61 can move in a direction away from the casing 2.

Fourth Embodiment

A developing cartridge 70 according to a fourth embodiment will be described with reference to FIGS. 20 through 23, wherein like parts and components are designated by the same reference numerals as those of the above-described embodiments to avoid duplicating description.

1. Structure of Developing Cartridge 70

Figure 20:
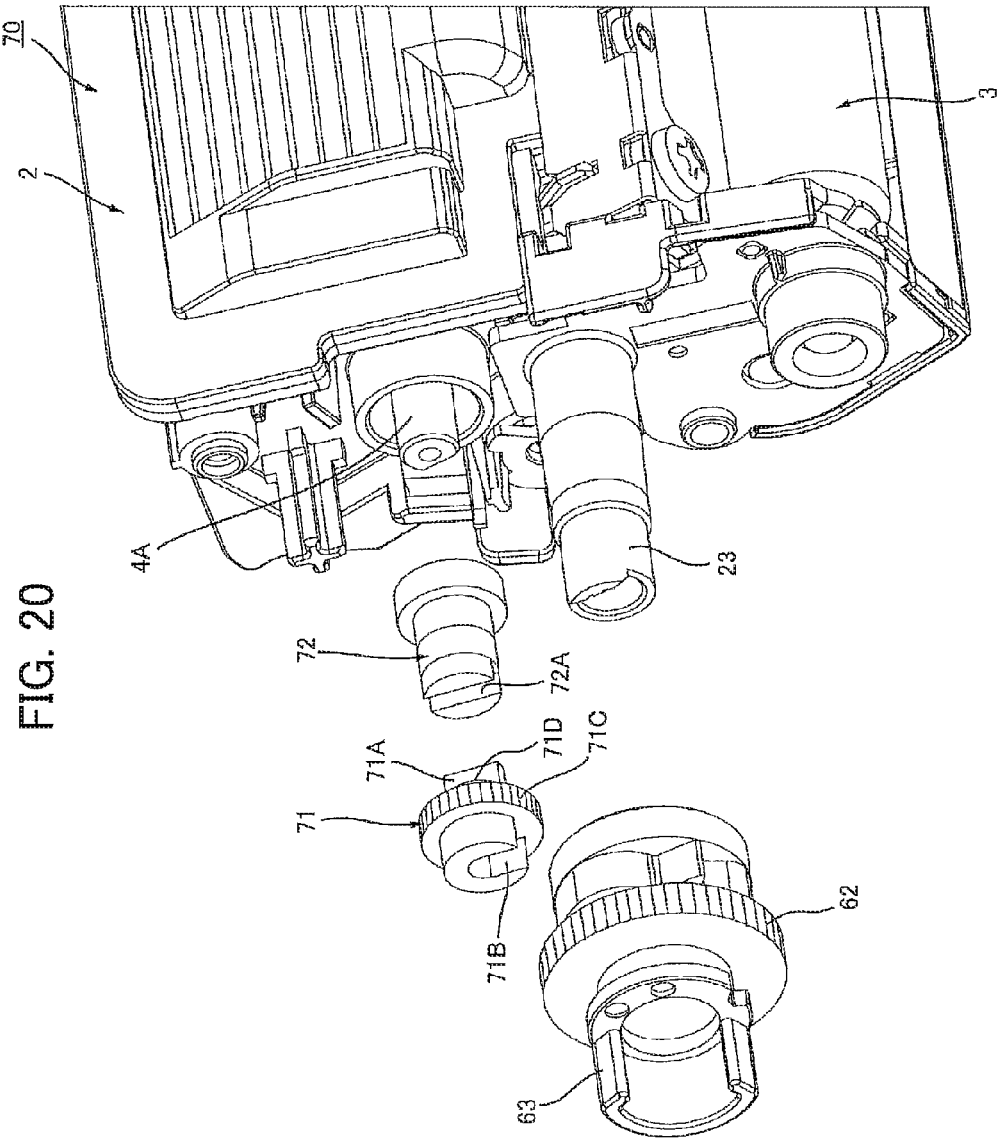
FIG. 20 is an exploded perspective view of a gear train provided in a developing cartridge according to a fourth embodiment.

As illustrated in FIG. 20, the developing cartridge 70 includes a first gear 71 capable of meshing with the second gear 62, and a connecting member 72 connecting the first gear 71 to the agitator shaft 4A. The first gear 71 can move in a direction crossing the predetermined direction from a first position (see FIG. 21) where the first gear 71 is rotatable together with the connecting member 72 to a second position (see FIG. 23) where connection between the first gear 71 and the connecting member 72 is released. When the first gear 71 is positioned at the first position, the first gear 71 meshes with the second gear 62. When the first gear 71 is positioned at the second position, the meshing between the first gear 71 and the second gear 62 is released.

Figure 21:
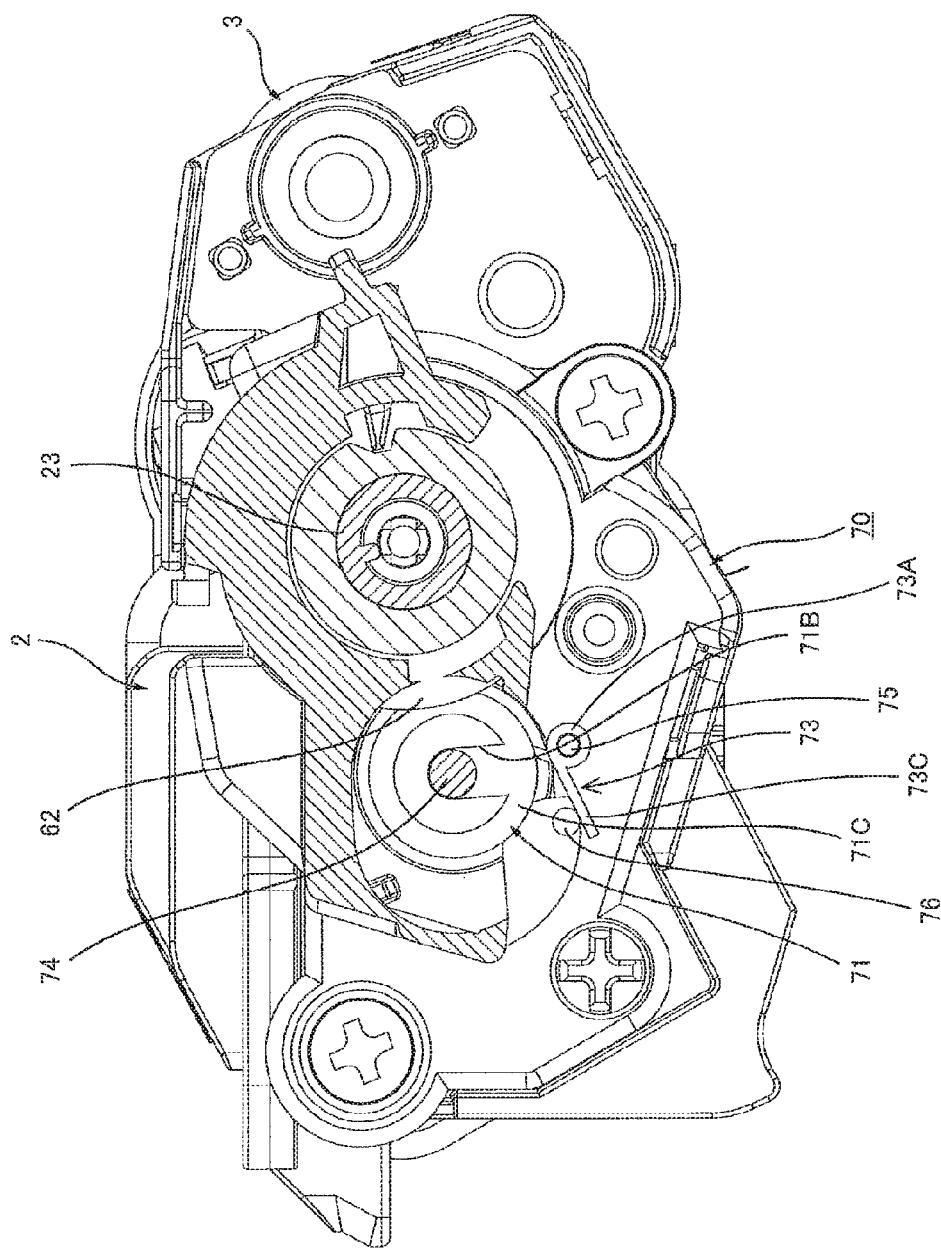
FIG. 21 is a view for explaining how a first gear according to the fourth embodiment is moved, in which the first gear is positioned at a first position.

Specifically, as illustrated in FIGS. 20 and 21, the connecting member 72 is positioned between the first gear 71 and the agitator shaft 4A in the predetermined direction. The connecting member 72 includes one end portion and the other end portion in the predetermined direction. The other end portion of the connecting member 72 is positioned farther from the casing 2 than the one end portion of the connecting member 72 from the casing 2 in the predetermined direction. The one end portion of the connecting member 72 is mounted to the other end portion of the agitator shaft 4A. The connecting member 72 is rotatable together with the agitator shaft 4A. The other end portion of the connecting member 72 includes a groove 72A. The groove 72A extends in a radial direction of the connecting member 72. Both ends of the groove 72A in the radial direction of the connecting member 72 are open.

The first gear 71 includes an engagement part 71A, a groove 71B, a plurality of gear teeth 71C, and a contact part 71D.

The plurality of gear teeth 71C is positioned on a peripheral surface of the first gear 71. The plurality of gear teeth 71C is arranged in a rotational direction of the first gear 71.

The contact part 71D of the first gear 71 is positioned between the plurality of gear teeth 71C and the engagement part 71A in the predetermined direction.

The engagement part 71A is positioned closer to the connecting member 72 than the plurality of gear teeth 71C to the connecting member 72 in the predetermined direction. The engagement part 71A extends in a radial direction of the first gear 71. The engagement part 71A protrudes from the contact part 71D of the first gear 71 in the predetermined direction toward the connecting member 72. The engagement part 71A is engaged with the groove 72A of the connecting member 72. With this configuration, in a state where the engagement part 71A is engaged with the groove 72A, the first gear 71 is rotatable together with the connecting member 72. Further, since the both ends of the groove 72A are open, the first gear 71 can slidably move relative to the connecting member 72 in an extending direction of the groove 72A.

The groove 71B is positioned opposite to the engagement part 71A and the contact part 71D with respect to the plurality of gear teeth 71C in the predetermined direction. The groove 71B extends in the radial direction of the first gear 71 and in an extending direction of the engagement part 71A. An end of the groove 71B is open in the radial direction of the first gear 71.

Figure 22:
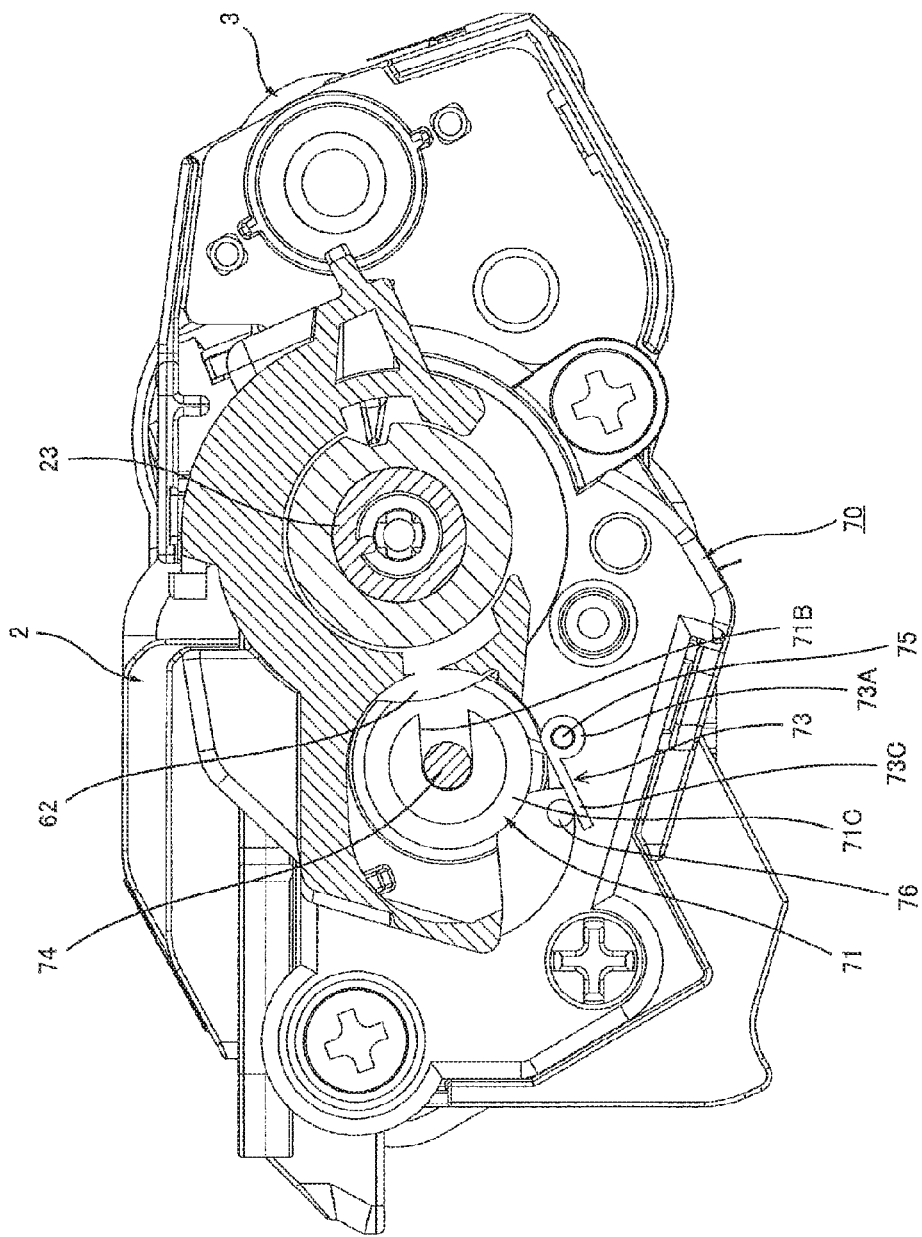
FIG. 22 is a view for explaining how the first gear according to the fourth embodiment is moved, illustrating a state following the state illustrated in FIG. 21, in which the first gear has been rotated from the first position.

As illustrated in FIGS. 21 and 22, a shaft 74 of the gear cover 17 is inserted into the groove 71B. The shaft 74 is formed integrally with the gear cover 17. More specifically, the shaft 74 extends from the inner surface of the gear cover 17.

Figure 23:
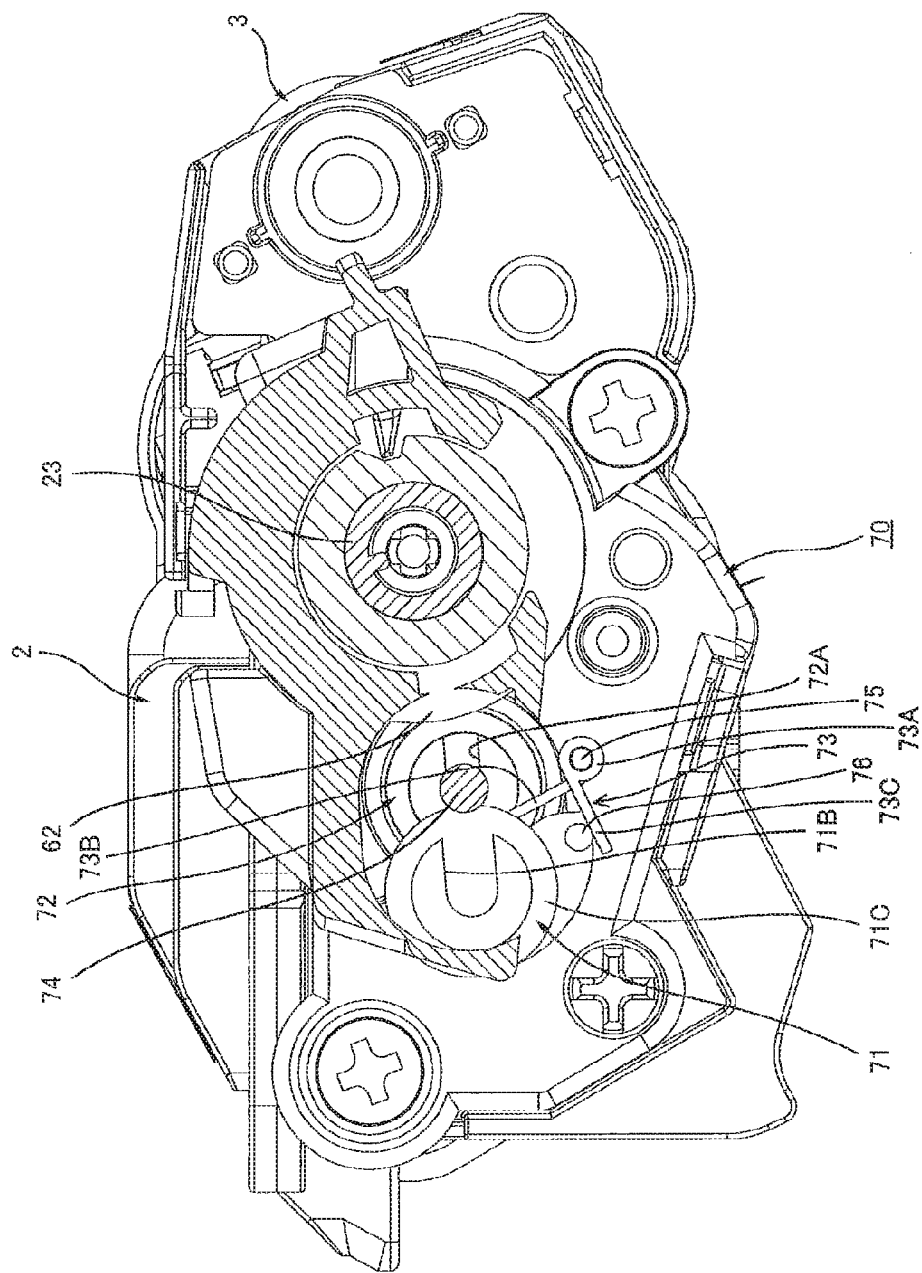
FIG. 23 is a view for explaining how the first gear according to the fourth embodiment is moved, illustrating a state following the state illustrated in FIG. 22, in which the first gear has been moved to a second position.

The first gear 71 is urged by a spring 73 in a direction away from the second gear 62. Specifically, as illustrated in FIGS. 21 through 23, the spring 73 includes a coil part 73A, and arm parts 73B and 73C. A boss 75 protruding from the outer surface of the other side of the casing 2 is mounted into the coil part 73A of the spring 73, so that the spring 73 is supported to the casing 2. The arm part 73B of the spring 73 contacts the contact part 71D to urge the first gear 71 in the direction away from the second gear 62, while the arm part 73C of the spring 73 contacts a boss 76 protruding from the outer surface of the other side of the casing 2.

The first gear 71 is positioned at the first position against an urging force of the spring 73 when a direction in which the spring 73 urges the first gear 71 crosses an extending direction of the groove 71B (see FIG. 21), since the shaft 74 is mounted into the groove 71B. The first gear 71 can move from the first position to the second position by the urging force of the spring 73 when the direction in which the spring 73 urges the first gear 71 becomes coincident with the extending direction of the groove 71B (see FIG. 23).

2. Operation of Developing Cartridge 70

Similar to the first embodiment, the actuator 31 (see FIG. 7A) contacts the shaft 23 when the developing cartridge 70 is attached to the image forming apparatus. Further, at this time, the first gear 71 is positioned at the first position, as illustrated in FIG. 21.

When a drive force is inputted into the coupling 11 (see FIG. 3) from the image forming apparatus, the drive force is transmitted from the coupling 11 to the connecting member 72 through a gear train (not illustrated) and the agitator shaft 4A. This causes the first gear 71 to rotate together with the connecting member 72. Upon receipt of the drive force from the first gear 71, the second gear 62 starts rotating. Further, the protrusion 63 circularly moves in accordance with the rotation of the second gear 62 and moves along the peripheral surface of the shaft 23.

Then, as illustrated in FIG. 22, as the first gear 71 rotates, the groove 71B rotates. When the extending direction of the groove 71B becomes coincident with the direction in which the spring 73 urges the first gear 71, the first gear 71 moves from the first position to the second position by the urging force of the spring 73, as illustrated in FIG. 23. Specifically, at this time, due to the urging force of the spring 73, the engagement part 71A slides along the groove 72A in the direction away from the second gear 62 and is disengaged from the groove 72A. The first gear 71 is thus separated from the connecting member 72. The first gear 71 separated from the connecting member 72 is pressed against the inner surface of the gear cover 17 by the spring 73.

When the first gear 71 has moved to the second position, the first gear 71 is separated from the second gear 62 to release the meshing between the first gear 71 and the second gear 62. As a result, the second gear 62 stops rotating. Accordingly, the protrusion 63 also stops circularly moving. Note that the timing at which the meshing between the first gear 71 and the second gear 62 is released is adjusted in such a way that the protrusion 63 moves past the opening 24 at least once after moving past the opening 24 once.

Incidentally, after the first gear 71 is positioned at the second position, the urging force of the spring 73 prevents the first gear 71 from moving back toward the first position. In other words, the spring 73 functions as a stopper for maintaining the first gear 71 at the second position after the spring 73 moves the first gear 71 to the second position.

The developing cartridge 70 according to the fourth embodiment can obtain the same operational advantages described in the first embodiment.

Fifth Embodiment

Figure 24:
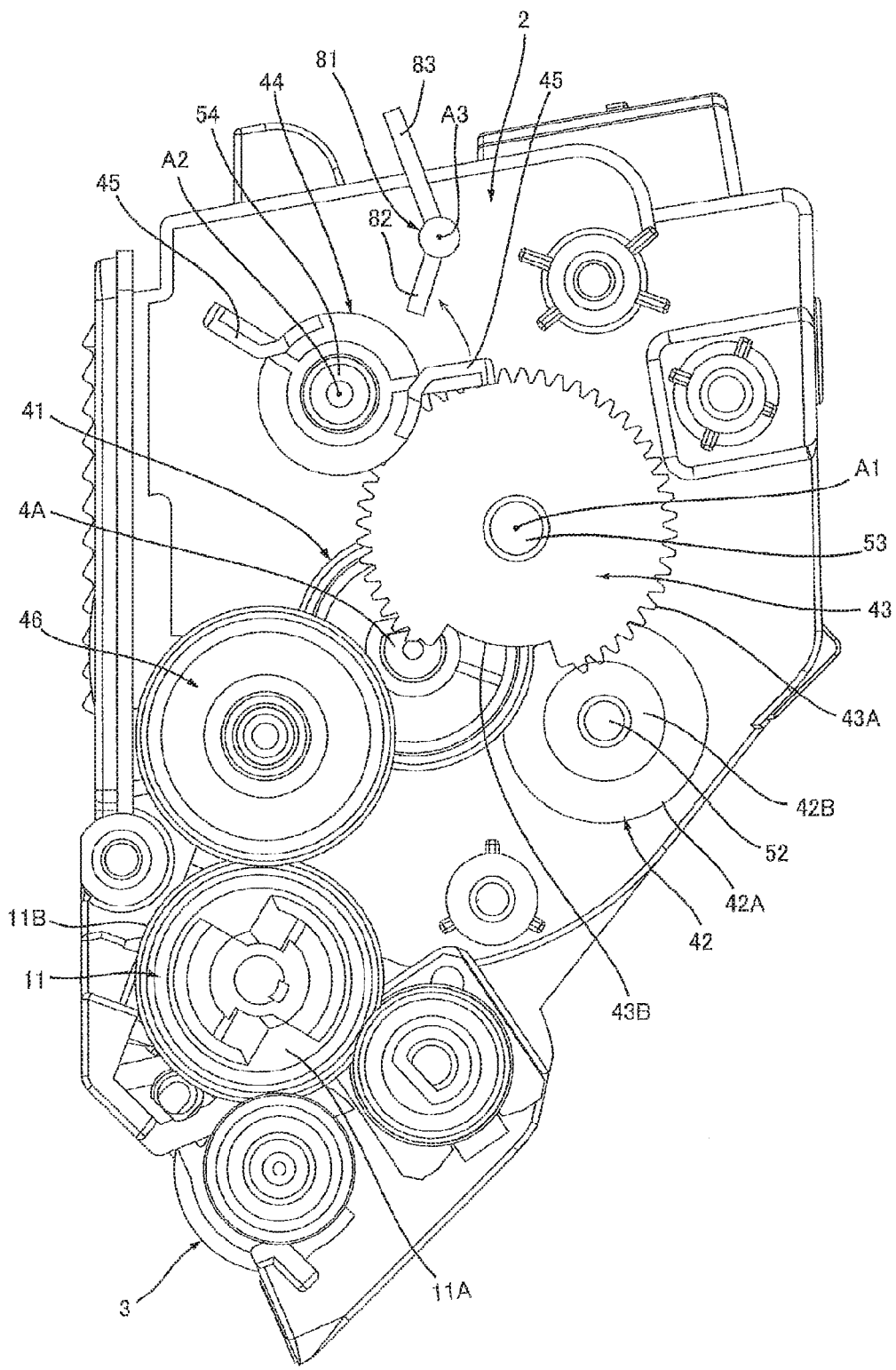
FIG. 24 is a side view of a developing cartridge according to a fifth embodiment.

A developing cartridge 80 according to a fifth embodiment will be described with reference to FIG. 24, wherein like parts and components are designated by the same reference numerals as those of the above-described embodiments to avoid duplicating description.

In the above-described first through fourth embodiments, the protrusion moves the actuator of the image forming apparatus. Alternatively, however, the actuator can be moved by a pivot member 81 that pivots by contact with the two protrusions 45.

The pivot member 81 can pivot about a third axis A3 extending in the predetermined direction. Specifically, the pivot member 81 includes a first contact part 82 and a second contact part 83. The first contact part 82 is contacted by the two protrusions 45. The second contact part 83 is positioned opposite to the first contact part 82 with respect to the third axis A3. The second contact part 83 can contact the actuator through an opening (not illustrated) formed in a gear cover (not illustrated).

While the first gear 43 rotates from the first position to the second position, each of the two protrusions 45 contacts the pivot member 81 at least once after contacting the pivot member 81 once. Thus, the pivot member 81 pivots four times during the rotation of the second gear 44.

While the description has been made in detail with reference to the embodiments thereof, it would be apparent to those skilled in the art that many modifications and variations may be made therein without departing from the scope of the disclosure.

What is claimed is:

1. A developing cartridge comprising:
   a first gear rotatable about a first axis extending in a predetermined direction, the first gear being movable from a first position to a second position, wherein rotation from the first position to the second position is less than a 360° rotation of the first gear;
   a second gear rotatable about a second axis extending in the predetermined direction upon receipt of a drive force from the first gear;
   a gear cover having an opening and covering at least a portion of the second gear; and
   a protrusion disposed on one side, in a radial direction of the second gear, of the second axis and extending in the predetermined direction, the protrusion being movable with the rotation of the second gear while the first gear moves from the first position to the second position,
   wherein the protrusion, disposed on the one side of the second axis, is configured to move past the opening at least twice by moving more than 360° about the second axis with the rotation of the second gear while the first gear rotates less than 360° from the first position to the second position.

2. The developing cartridge according to claim 1, further comprising an idle gear configured to mesh with the first gear,
wherein the second gear stops rotating upon release of the meshing between the first gear and the idle gear.

3. The developing cartridge according to claim 1, wherein the first gear is configured to mesh with the second gear, and
wherein the second gear stops rotating upon release of the meshing between the first gear and the second gear.

4. The developing cartridge according to claim 1, wherein the first gear includes a plurality of gear teeth on a peripheral surface of the first gear.

5. The developing cartridge according to claim 4, wherein the first gear has a toothless part.

6. The developing cartridge according to claim 4, further comprising an idle gear configured to mesh with the first gear, the idle gear including a plurality of gear teeth,
wherein, when the first gear is at the second position, the first gear does not mesh with any one of the plurality of gear teeth of the idle gear.

7. The developing cartridge according to claim 4, wherein the second gear includes a plurality of gear teeth on a peripheral surface of the second gear, and
wherein numbers of the plurality of gear teeth of the first gear are equal to or greater than 1.5 times as large as numbers of the plurality of gear teeth of the second gear.

8. The developing cartridge according to claim 1, wherein the first gear has an addendum circle whose diameter is equal to or greater than 1.5 times as large as a diameter of an addendum circle of the second gear.

9. The developing cartridge according to claim 1, wherein the first gear is movable from the first position to the second position in the predetermined direction.

10. The developing cartridge according to claim 1, further comprising a stopper configured to maintain the first gear at the second position.

11. The developing cartridge according to claim 1, further comprising a casing configured to accommodate a developer therein.

12. A developing cartridge comprising:
a first gear rotatable about a first axis extending in a predetermined direction, the first gear being movable from a first position to a second position;
a second gear rotatable about a second axis extending in the predetermined direction upon receipt of a drive force from the first gear;
a protrusion extending in the predetermined direction, the protrusion being movable with the rotation of the second gear while the first gear moves from the first position to the second position; and
a pivot member pivotally movable about a third axis extending in the predetermined direction upon contact with the protrusion,
wherein the protrusion is further in contact with the pivot member at least twice while the first gear moves from the first position to the second position.

* * * * *